United States Patent
Takeda et al.

(10) Patent No.: US 9,555,330 B2
(45) Date of Patent: Jan. 31, 2017

(54) INFORMATION PROCESSING SYSTEM, STORAGE MEDIUM HAVING STORED THEREIN INFORMATION PROCESSING PROGRAM, INFORMATION PROCESSING APPARATUS, INPUT DEVICE, AND INFORMATION PROCESSING METHOD

(75) Inventors: Genyo Takeda, Kyoto (JP); Noboru Wakitani, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 896 days.

(21) Appl. No.: 13/357,940

(22) Filed: Jan. 25, 2012

(65) Prior Publication Data
US 2012/0209563 A1 Aug. 16, 2012

(30) Foreign Application Priority Data
Feb. 10, 2011 (JP) .................. 2011-027448

(51) Int. Cl.
*G06F 3/042* (2006.01)
*A63F 13/42* (2014.01)
(Continued)

(52) U.S. Cl.
CPC .............. *A63F 13/42* (2014.09); *A63F 13/213* (2014.09); *A63F 13/214* (2014.09);
(Continued)

(58) Field of Classification Search
CPC .......... G06F 3/041; G06F 3/042; G06F 3/045; G06F 3/0421; G06F 3/0423; G06F 3/0428; G06F 2203/04109; A63F 2300/8005; A63F 13/42; A63F 13/214; A63F 13/06; A63F 2300/1043; A63F 2300/1056; A63F 2300/1068; A63F 2300/1087; A63F 2300/6045; A63F 2300/61
(Continued)

(56) References Cited

U.S. PATENT DOCUMENTS

| 5,076,584 A | 12/1991 | Openiano |
| 5,414,256 A * | 5/1995 | Gurner et al. ................ 250/221 |

(Continued)

FOREIGN PATENT DOCUMENTS

| CA | 2089932 | 8/1993 |
| EP | 11101623 | 4/1999 |

(Continued)

OTHER PUBLICATIONS

Office Action (4 pgs.) dated Aug. 25, 2014 issued in corresponding Japanese Application No. JP2011-027448 with an at least partial Engligh-language translation (3 pgs.).

(Continued)

*Primary Examiner* — Lun-Yi Lao
*Assistant Examiner* — Jarurat Suteerawongsa
(74) *Attorney, Agent, or Firm* — Nixon & Vanderhye, P.C.

(57) ABSTRACT

An example of a configuration of an information processing system of the exemplary embodiment includes a first input device on which at least a portion of a user's body is allowed to be put and an information processing apparatus for processing data obtained from the first input device. The first input device includes a first platform on which at least a portion of a user's body is put; and a distance data output unit. The distance data output unit outputs distance data determined in accordance with a distance to an object positioned in a direction away from a platform surface of the first platform. The information processing apparatus includes a data acquisition unit and a processing unit. The data acquisition unit acquires the distance data outputted by the distance data output unit. The processing unit performs a predetermined process, based on the distance data acquired by the data acquisition unit.

38 Claims, 17 Drawing Sheets

(51) Int. Cl.
*A63F 13/214* (2014.01)
*A63F 13/24* (2014.01)
*A63F 13/213* (2014.01)
*A63F 13/46* (2014.01)
*A63F 13/218* (2014.01)
*A63F 13/98* (2014.01)

(52) U.S. Cl.
CPC ............ *A63F 13/218* (2014.09); *A63F 13/24* (2014.09); *A63F 13/46* (2014.09); *A63F 13/98* (2014.09); *A63F 2300/1043* (2013.01); *A63F 2300/1056* (2013.01); *A63F 2300/1068* (2013.01); *A63F 2300/1087* (2013.01); *A63F 2300/6045* (2013.01); *A63F 2300/61* (2013.01); *A63F 2300/8005* (2013.01); *G06F 3/042* (2013.01)

(58) Field of Classification Search
USPC .................................................. 345/173, 175
See application file for complete search history.

(56) References Cited

U.S. PATENT DOCUMENTS

| | | | | |
|---|---|---|---|---|
| 5,724,265 | A * | 3/1998 | Hutchings | ............ A43B 3/0005 235/105 |
| 6,122,960 | A * | 9/2000 | Hutchings | .............. A63B 24/00 73/493 |
| 7,192,387 | B2 * | 3/2007 | Mendel | .................. A63B 24/00 434/247 |
| 7,604,571 | B2 * | 10/2009 | Wilkins | ................... A63B 5/00 434/247 |
| 8,253,586 | B1 * | 8/2012 | Matak | ...................... H04Q 9/00 340/870.07 |
| 2002/0055383 | A1 | 5/2002 | Onda et al. | |
| 2002/0103024 | A1 | 8/2002 | Jeffway, Jr. et al. | |
| 2007/0032353 | A1 * | 2/2007 | Wilkins | ................... A63B 5/00 482/54 |
| 2007/0119698 | A1 | 5/2007 | Day | |
| 2007/0237029 | A1 | 10/2007 | Watson | |
| 2008/0119763 | A1 | 5/2008 | Wiener | |
| 2008/0191864 | A1 * | 8/2008 | Wolfson | ........................ 340/524 |
| 2009/0221338 | A1 | 9/2009 | Stewart et al. | |
| 2009/0298479 | A1 | 12/2009 | Kasama | |
| 2010/0007528 | A1 | 1/2010 | Urata et al. | |
| 2010/0224420 | A1 * | 9/2010 | Miyanaga | .................. 177/25.12 |
| 2010/0302142 | A1 * | 12/2010 | French et al. | ................. 345/156 |

FOREIGN PATENT DOCUMENTS

| | | |
|---|---|---|
| JP | 54-159029 | 12/1979 |
| JP | 58-50080 | 3/1983 |
| JP | 6-54935 | 3/1994 |
| JP | 11101623 | 4/1999 |
| JP | 2008-67737 | 3/2008 |
| JP | 2010-211379 | 9/2010 |
| WO | 2010/141737 | 12/2010 |

OTHER PUBLICATIONS

Office Action (6 pgs.) dated Aug. 25, 2014 issued in corresponding European Application No. 12 153 093.5.
Aug. 5, 2013 Office Action for EP 12153093.5, 6 pages.

* cited by examiner

F I G. 2
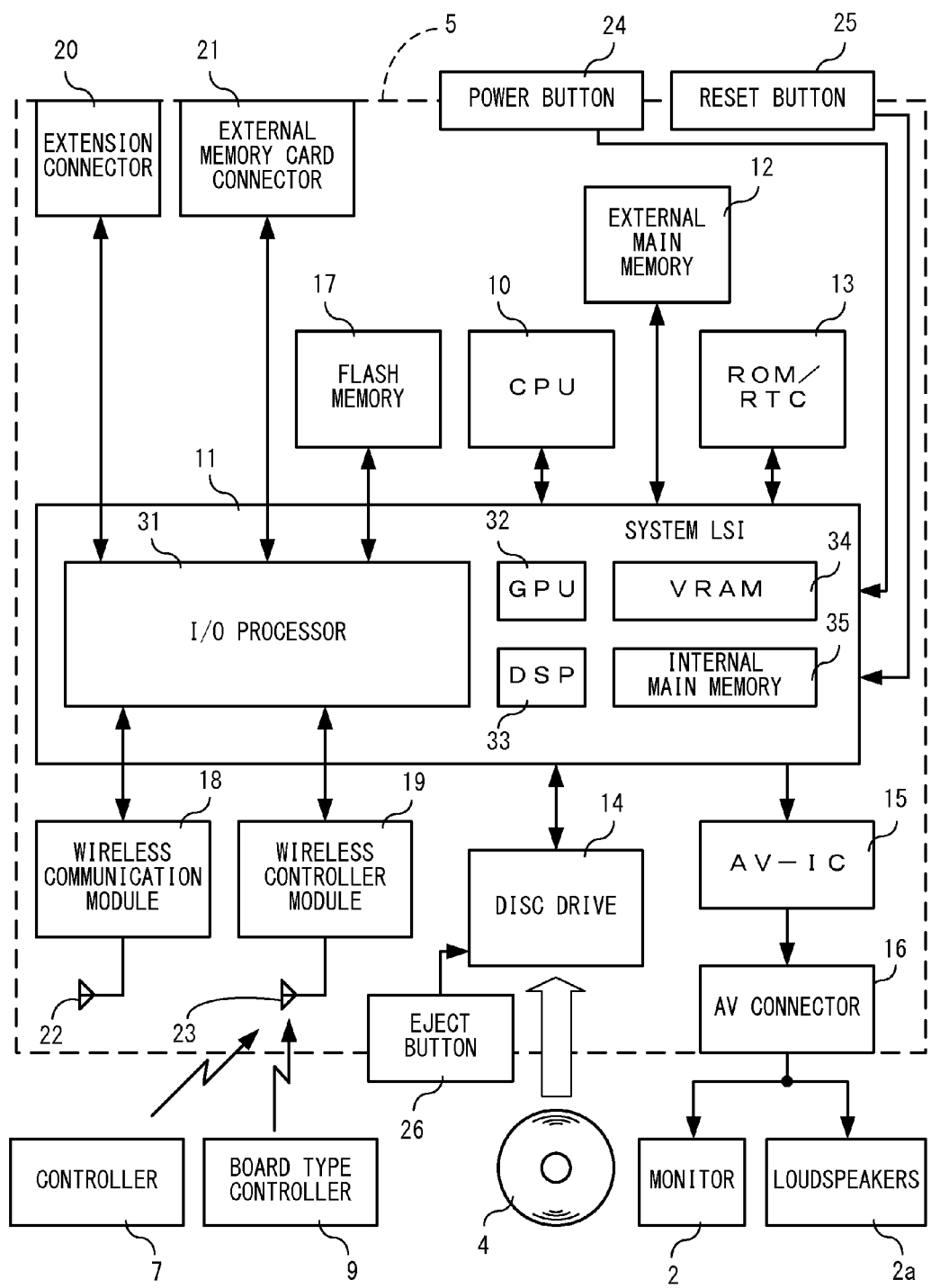

F I G. 4
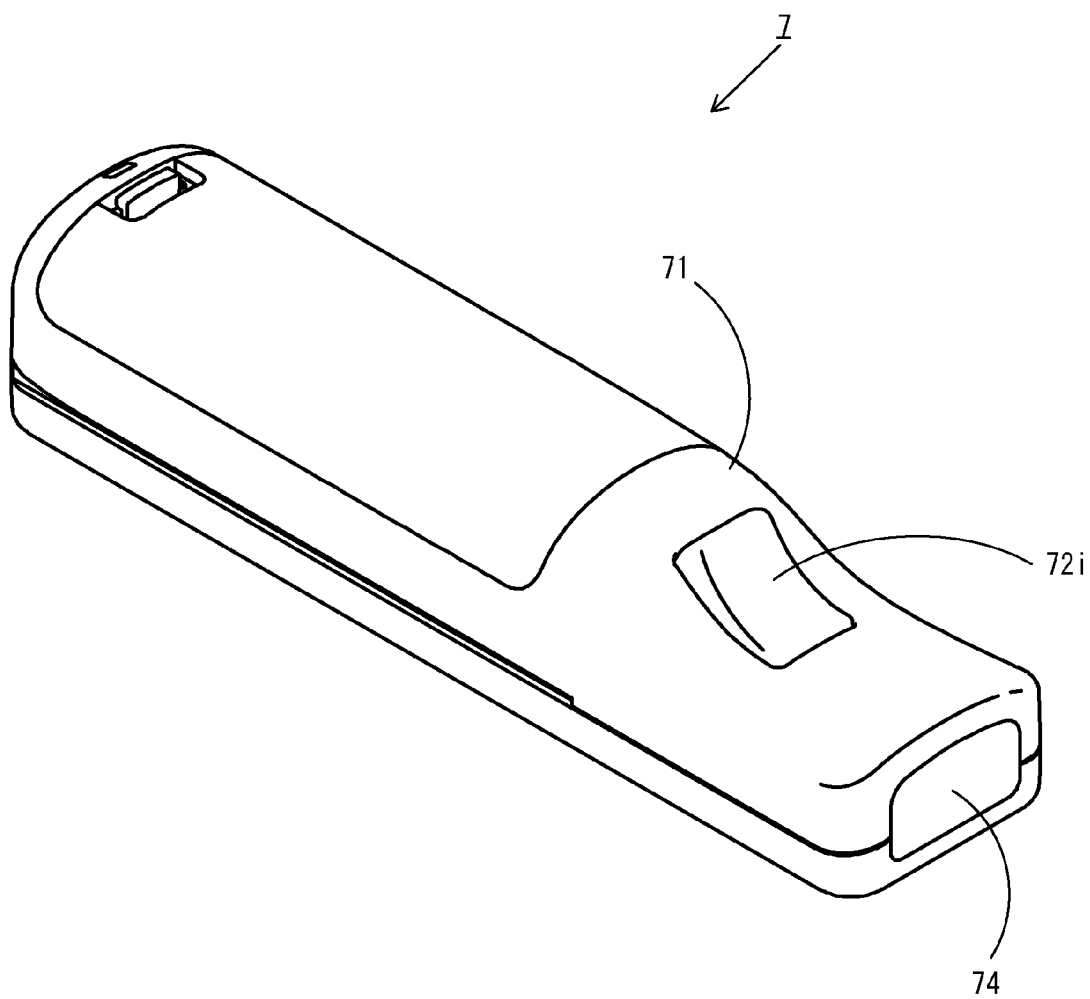

F I G. 5
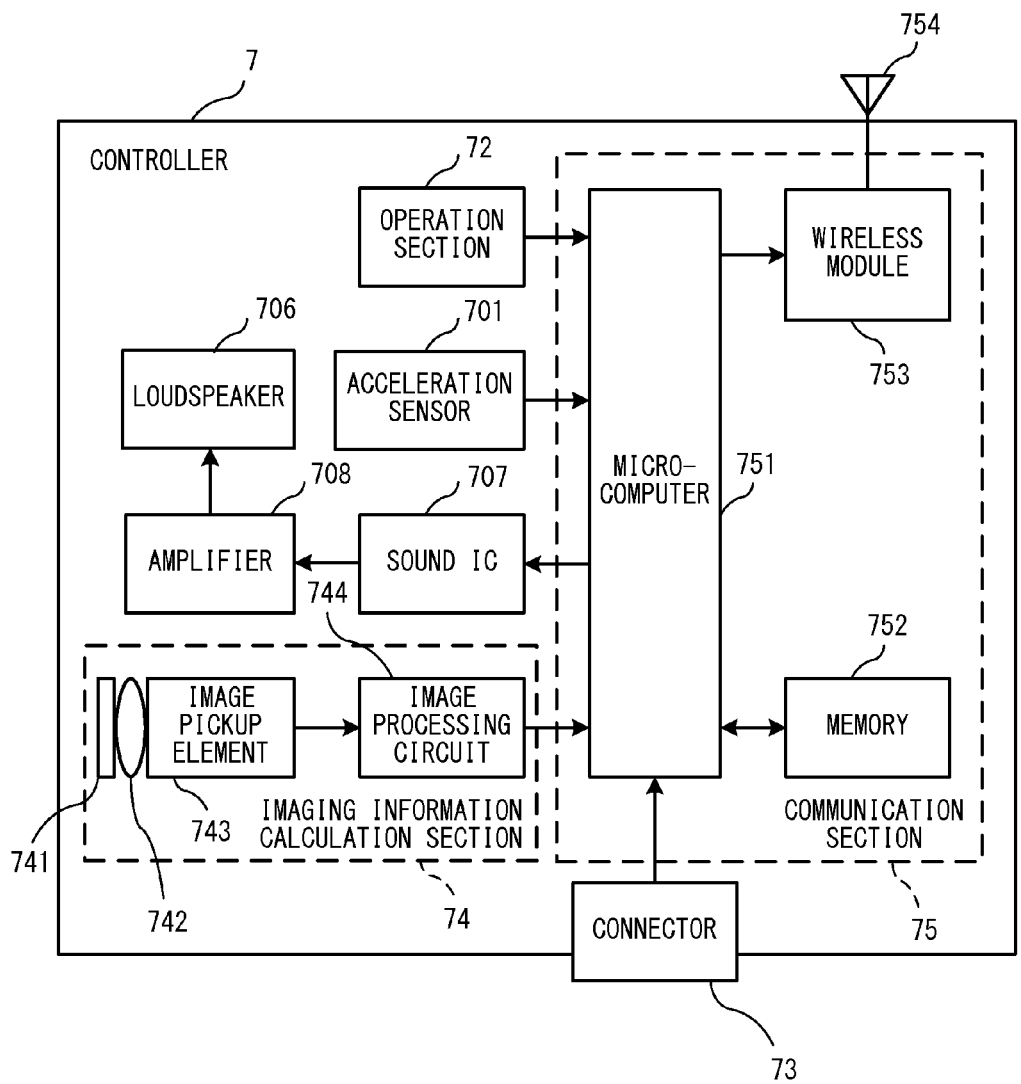

INFORMATION PROCESSING SYSTEM, STORAGE MEDIUM HAVING STORED THEREIN INFORMATION PROCESSING PROGRAM, INFORMATION PROCESSING APPARATUS, INPUT DEVICE, AND INFORMATION PROCESSING METHOD

CROSS REFERENCE TO RELATED APPLICATION

The disclosure of Japanese Patent Application No. 2011-027448, filed on Feb. 10, 2011, is incorporated herein by reference.

FIELD

Techniques described herein relate to an information processing system, a storage medium having stored therein an information processing program, an information processing apparatus, an input device, and an information processing method, and more particularly, relates to, for example, an information processing system for performing processes based on user's actions, a storage medium having stored therein an information processing program, an information processing apparatus, an input device, and an information processing method.

BACKGROUND AND SUMMARY

Conventionally, there is a pedometer for counting steps by detecting the up and down movements of a human body on walking. The pedometer is used by being borne on the human body. When the pedometer borne on the human body is shaken up and down by the up and down motion of the body accompanied by walking or running, a pendulum in the pedometer is shaken, a permanent magnet attached to the tip of the pendulum is shaken up and down on the side of the reed switch, and the permanent magnet approaches and moves away from the reed switch, thereby switching signals corresponding to the up and down movements of the pendulum are obtained at both ends of the reed switch. By counting the switching signals by a counter, the counted value is displayed on an indicator as the steps.

The pedometer, however, is capable of merely counting step count of the user bearing the pedometer. That is, the pedometer can only determine whether the user has walked or not, and cannot determine how the user walks or runs. For example, the pedometer determines as the same one step whether the user has walked energetically or less energetically. It is thus difficult to consider the exertion level of exercise based on the way of walking of the user.

Therefore, an object of the exemplary embodiment is to provide an information processing system for comprehensively determining the user's action, a storage medium having stored therein an information processing program, an information processing apparatus, an input device, and an information processing method.

The exemplary embodiment can employ the following configurations to achieve the above-mentioned object. It should be understood that the scope of the exemplary embodiment is interpreted only by the scope of the claims. In event of any conflict between the scope of the claims and the scope of the description in this section, the scope of the claims controls.

An example of a configuration of an information processing system of the exemplary embodiment includes a first input device on which at least a portion of a user's body is allowed to be put and an information processing apparatus for processing data obtained from the first input device. The first input device includes a first platform on which at least a portion of a user's body is put; and a distance data output unit. The distance data output unit outputs distance data determined in accordance with a distance to an object positioned in a direction away from a platform surface of the first platform. The information processing apparatus includes a data acquisition unit and a processing unit. The data acquisition unit acquires the distance data outputted by the distance data output unit. The processing unit performs a predetermined process, based on the distance data acquired by the data acquisition unit.

According to the above configuration, the distance to the object above the first platform is detected, and the processing using the distance is possible. For example, since the detection of the height of a portion (for example, foot) of the user above the first platform is possible, comprehensive determination of the user's action is possible.

A surface, on which a user puts his/her foot sole, may be set on the platform surface of the first platform. In this case, the at least one distance data output unit may be disposed below the surface, and output distance data determined in accordance with a distance to an object present above the surface.

A pair of surfaces, on which the user puts his/her feet soles, respectively, may be provided on the platform surface of the first platform. In this case, the at least one distance data output unit may be disposed below at least one of the pair of surfaces, and output distance data determined in accordance with a distance to an object present above the at least one of the pair of surfaces.

According to the above configuration, the processing using the height of at least one raised foot of the user is possible.

The distance data output unit may be disposed below each of the pair of surfaces, and output distance data determined in accordance with a distance to an object present above the surface.

According to the above configuration, the processing using the heights of the raised feet of the user is possible.

Also, two of the distance data output unit may be disposed below the platform surface at a predetermined distance therebetween in a direction along with the platform surface.

According to the above configuration, detection of heights of a plurality of portions of the user on the first platform, a posture of one portion (for example, angle), and the like is possible, and the processing using such information is possible.

Also, the first platform may include a plurality of projections projected from the platform surface.

According to the above configuration, manual pressure can be applied to the user's soles on the first platform.

Also, the plurality of projections may be configured in an up/down movable manner so as to be in a state in which either the plurality of projections project from the platform surface or the plurality of projections retract from the platform surface.

According to the above configuration, whether to apply the manual pressure to the feet soles can be changed accordingly, depending on the user's preference.

Also, the processing unit may include a parameter calculation unit. The parameter calculation unit calculates a parameter corresponding to an energy consumed by the user, based on a distance in accordance with the distance data. In this case, the processing unit may perform a predetermined process, based on the parameter calculated by the parameter calculation unit.

According to the above configuration, the calculation of the energy consumed by the user based on the comprehensive determination of the user's action is possible.

Also, the parameter calculation unit may calculate the parameter so that the longer the distance in accordance with the distance data is, the larger the energy becomes.

According to the above configuration, the calculation of the energy in a way that, for example, the higher the user raises his/her feet the greater the energy is consumed, is possible.

Also, the distance data output unit may repeatedly output the distance data determined in accordance with the distance to the object positioned in the direction away from the platform surface of the first platform. The data acquisition unit may repeatedly acquire the distance data repeatedly outputted by the distance data output unit. The parameter calculation unit may calculate the parameter each time the data acquisition unit repeatedly acquires the distance data.

According to the above configuration, the energy consumed due to the user's action can be calculated in real time.

Also, the parameter calculation unit may calculate the parameter, based on a maximum value of the distance during a period in which the distance in accordance with the distance data is indicating a predetermined value or above.

According to the above configuration, the consumed energy in accordance with the distance information can readily be calculated.

Also, the parameter calculation unit may calculate the parameter, based on an integration value of the distance in accordance with the distance data.

According to the above configuration, the consumed energy in accordance with the distance information can readily be calculated.

Also, the parameter calculation unit may calculate the parameter, based on a maximal value of the distance in accordance with the distance data.

According to the above configuration, the consumed energy in accordance with the distance information can readily be calculated.

Also, a plurality of the distance data output units may be disposed below the platform surface, and each output distance data determined in accordance with a distance to the object present above the platform surface. In this case, the parameter calculation unit may calculate the parameter, based on a distance in accordance with the distance data outputted by each of the plurality of distance data output units, and, by summing the parameters, calculate a parameter corresponding to an accumulated energy consumed by the user.

According to the above configuration, the accumulated energy can be calculated by summing the consumed energies in accordance with the plurality of distance information.

Also, the processing unit may include a count calculation unit. The count calculation unit calculates the number of times the user has moved his/her feet up and down on the platform surface, based on the data outputted by the first input device. In this case, the parameter calculation unit may calculate the parameter, based on the number of times the user has moved his/her feet up and down, calculated by the count calculation unit, and the distance in accordance with the distance data.

According to the above configuration, the calculation of the consumed energy in consideration of the number of times the user has performed the up and down actions (for example, perform step action) on the first platform is possible.

Also, the parameter calculation unit may calculate the parameter so that the greater the number of times the user has moved his/her feet up and down, calculated by the count calculation unit, is, the larger the energy becomes.

According to the above configuration, the calculation of the consumed energy in a way that the greater the number of times the user performs the up and down movements, the greater the energy is consumed, is possible.

Also, the distance data output unit may include a radiation unit, a reception unit, and a detection unit. The radiation unit radiates a predetermined wave in the direction away from the platform surface of the first platform. The reception unit receives a reflected wave which is the predetermined wave reflected from the object. The detection unit detects the distance to the object positioned in the direction away from the platform surface of the first platform, using information regarding the reflected wave received by the reception unit.

Also, the detection unit may detect the distance, based on a position at which the reflected wave is received.

Also, the detection unit may detect the distance, based on time at which the reflected wave has been received.

According to the above configuration, the distance to the object can be detected by using the reflection of a wave such as electromagnetic wave or sound wave.

Also, the distance data output unit may wirelessly transmit the distance data to the information processing apparatus directly or via other apparatus.

According to the above configuration, since the cables for communication with the information processing apparatus may not be connected to the first input device, the movement of the first input device is facilitated and the disposition distance between the information processing apparatus and the first input device is not limited due to the length of the cable or the like.

Also, the information processing system may further include a second input device and a cable. The second input device allows the user for operation input thereto. The cable connects between the first input device and the second input device. In this case, the distance data output unit may output the distance data to the second input device via the cable. The second input device may include a transmission unit for wirelessly transmitting, to the information processing apparatus, data representing the operation input to the second input device, together with the distance data outputted by the distance data output unit.

According to the above configuration, data of a plurality of devices is transmitted by one-time wireless transmission, and thus the reduction of cost for the wireless transmission can be expected.

Also, the first input device may further include at least one load data output unit. The load data output unit outputs load data determined in accordance with a load applied to the first platform. In this case, the data acquisition unit may acquire the distance data outputted by the distance data output unit and the load data outputted by the load data output unit. The processing unit may perform the predetermined process, based on the distance data and the load data acquired by the data acquisition unit.

According to the above configuration, the processing using the user's load applied to the first platform and the load change is possible. Thus, the user's action can comprehensively be determined Also, a plurality of the load data output units may be disposed below the first platform at different positions, and each outputs the load data determined in accordance with the load applied to the first platform.

According to the above configuration, the processing using the position (for example, the center-of-gravity position) of the load applied to the first platform is also possible, and thus comprehensive determination of the user's action is possible.

Also, the first input device may include a first housing and a second housing. The first housing has a second platform on which at least a portion of a user's body is put. The second housing has the first platform, and is detachably mounted on a platform surface of the second platform so as to have the first platform face up. In this case, the first housing may be provided with at least the load data output unit. The second housing may be provided with at least the distance data output unit. The load data output unit may output, via the second housing, the load data determined in accordance with the load applied to the first platform.

According to the above configuration, the second housing provided with the distance data output unit is configured to be detachable to the first housing provided with the load data output unit. Thus, the usage of the first input device according to the purpose intended by the use is possible. In addition, if there is already an input device corresponding to the first housing provided with the load data output unit, new functions are added by newly attaching the second housing to the existing input device. Thus, effective utilization of the existing input device and cost reduction with respect to the additional function can be expected.

Also, the information processing apparatus may further include a display control unit for displaying, on a display device, a result of the predetermined process performed by the processing unit.

According to the above configuration, an image based on a result of comprehensive determination of the user's action can be shown to the user.

Also, the processing unit may include a determination unit and an informing unit. The determination unit determines whether a distance in accordance with the distance data acquired by the data acquisition unit reaches a predetermined value. The informing unit informs the user of a message determined in accordance with a determination result by the determination unit.

According to the above configuration, a message is informed to the user if a portion of the user, which is a detection object, is high or low when the user is prompted to perform an exercise. Thereby, good or poor of the exercise the user is performing can be informed to the user.

Also, the first input device may further include at least one load data output unit. The load data output unit outputs load data determined in accordance with a load applied to the first platform. In this case, the data acquisition unit may acquire the distance data outputted by the distance data output unit and the load data outputted by the load data output unit. The parameter calculation unit may calculate the parameter, based on the distance in accordance with the distance data and a load in accordance with the load data.

According to the above configuration, the calculation of the consumed energy in consideration of the user's weight is possible.

Also, the information processing apparatus may further include a weight acquisition unit. The weight acquisition unit acquires weight of weights borne by the user on the first input device, in accordance with user input. In this case, the parameter calculation unit may calculate the parameter, based on the distance in accordance with the distance data and the weight acquired by the weight acquisition unit.

According to the above configuration, the calculation of the consumed energy in consideration of the weight of the weights borne by the user is possible.

Also, the distance data output unit may detect the distance to the object positioned in the direction away from the platform surface of the first platform, and output the distance data representing the distance.

Also, the exemplary embodiment may be implemented in a form of: a computer-readable storage medium having stored therein an information processing program causing a computer to execute operations performed by at least part of the above-described configuration units; an information processing apparatus included in the information processing system; an input device included in the information processing system; and an information processing method which includes the operations performed by at least part of the above-described configuration units.

According to the exemplary embodiment, the distance to the object above the first platform is detected and the processing using the distance is possible. For example, the height of a portion (for example, foot) of the user on the first platform can be detected, and thus the comprehensive determination of the user's action is possible.

These and other objects, features, aspects and advantages of the exemplary embodiment will become more apparent from the following detailed description when taken in conjunction with the accompanying drawings.

BRIEF DESCRIPTION OF THE DRAWINGS

FIG. 2 is a functional block diagram showing an example of a non-limiting game apparatus body 5 shown in FIG. 1;

FIG. 4 is a perspective view of an example of the non-limiting controller 7 shown in FIG. 3 as viewed from the bottom front surface thereof;

FIG. 5 is a block diagram illustrating an exemplary structure of the non-limiting controller 7 shown in FIG. 3;

DETAILED DESCRIPTION OF NON-LIMITING EXAMPLE EMBODIMENTS

Figure 1:
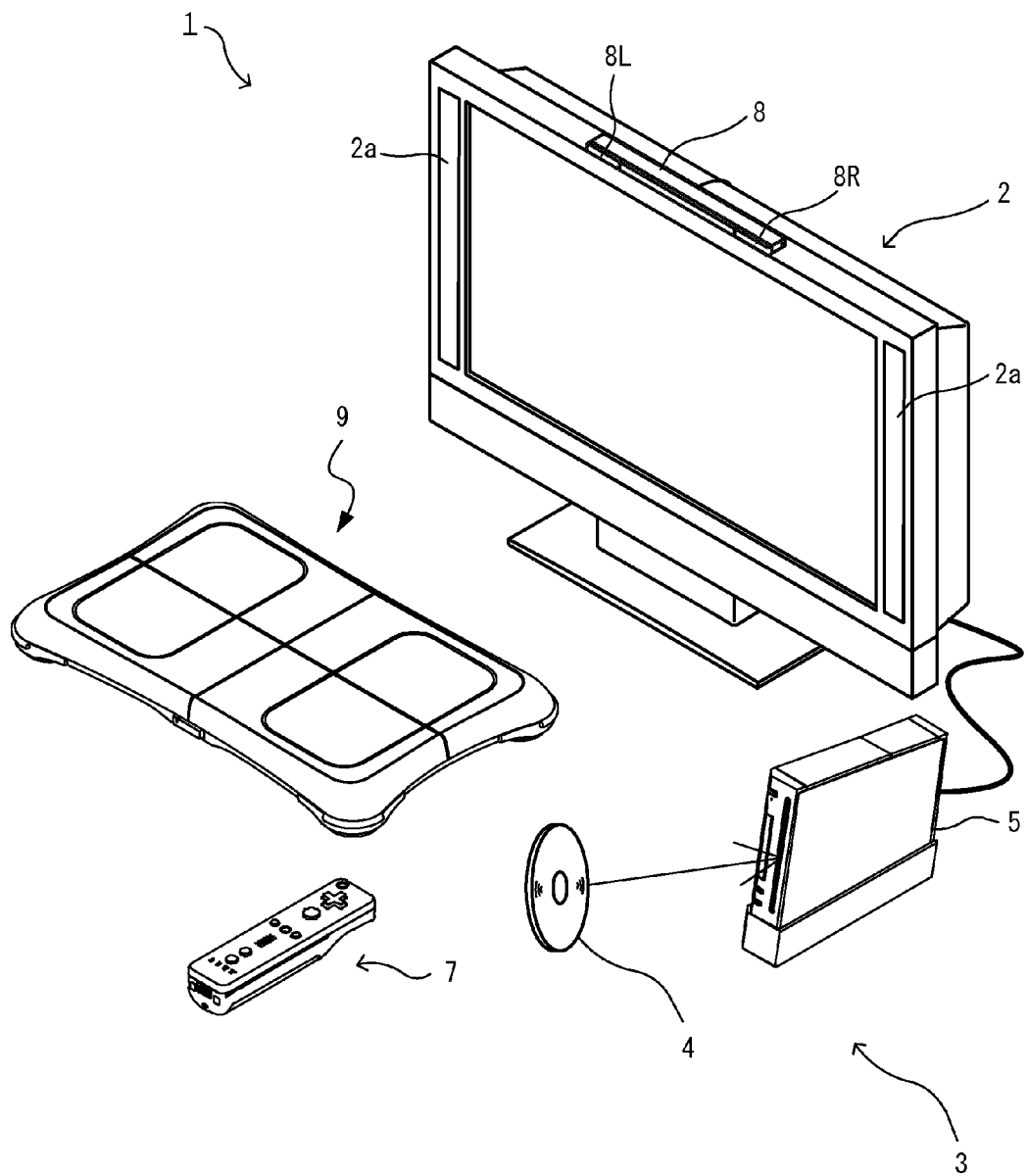
FIG. 1 is an external view illustrating an example of a non-limiting game system 1.

With reference to FIG. 1, an information processing apparatus for executing an information processing program according to one exemplary embodiment and an information processing system including the information processing apparatus will be described. Hereinafter, in order to provide a specific description, a stationary game apparatus body 5 is used as an example of the information processing apparatus, and a game system including the game apparatus body 5 will be described. FIG. 1 is an external view showing an example of a game system 1 including a stationary game apparatus 3. FIG. 2 is a block diagram illustrating an example of the game apparatus body 5. Hereinafter, the game system 1 will be described.

As shown in FIG. 1, the game system 1 includes a household television receiver (hereinafter, referred to as a monitor) 2 which is an example of display means, and the stationary game apparatus 3 connected to the monitor 2 via a connection cord. The monitor 2 includes loudspeakers 2a for outputting, in the form of sound, a sound signal outputted from the game apparatus 3. Further, the game apparatus 3 includes: an optical disc 4 having stored therein a program (e.g., a game program) which is an example of the information processing program of the present exemplary embodiment; the game apparatus body 5 having a computer for executing the program stored in the optical disc 4 to display a game screen on the monitor 2; a controller 7 for providing the game apparatus body 5 with operation information required for operating, for example, objects displayed on a display screen; and a board type controller 9. The game apparatus body 5 is wirelessly connected to the controller 7 and the board type controller 9 so as to enable wireless communication therebetween. For example, the wireless communication is executed according to the Bluetooth (registered trademark) standard. However, the wireless communication may be executed in accordance with other standards such as standards for infrared communication or a wireless LAN.

The game apparatus body 5 has a wireless controller module 19 (see FIG. 2) incorporated therein. The wireless controller module 19 receives data which is wirelessly transmitted from the controller 7 and/or the board type controller 9, and allows the game apparatus body 5 to transmit the data to the controller 7, thereby connecting between the controller 7 and/or the board type controller 9 and the game apparatus body 5 through wireless communication. Furthermore, the optical disc 4, typifying an information storage medium used for the game apparatus body 5 in an exchangeable manner, is detachably attached to the game apparatus body 5.

The game apparatus body 5 has mounted thereto a flash memory 17 (see FIG. 2) which functions as a backup memory permanently storing data such as saved data. The game apparatus body 5 executes the game program or the like stored in the optical disc 4 to display a result thereof as a game image on the monitor 2. The game program or the like to be executed may be previously stored in the flash memory 17 as well as in the optical disc 4. Further, the game apparatus body 5 may reproduce a state of a game played in the past, by using the saved data stored in the flash memory 17, and display an image of the game state on the monitor 2. A user of the game apparatus 3 can enjoy the game progress by operating the controller 7 while viewing the game image displayed on the monitor 2.

The controller 7 and the board type controller 9 each wirelessly transmit transmission data such as operation information, by using, for example, the Bluetooth technology, to the game apparatus body 5 having a wireless controller module 19. The controller 7 is operation means for performing, for example, selection of options displayed on the display screen of the monitor 2. The controller 7 includes a housing which is small enough to be held by one hand, and a plurality of operation buttons (including a cross key and the like) which are exposed at the surface of the housing. In addition, as will be described later, the controller 7 includes an imaging information calculation section 74 for taking an image viewed from the controller 7. As exemplary imaging targets of the imaging information calculation section 74, two LED modules (hereinafter, referred to as "markers") 8L and 8R are provided in the vicinity of the display screen of the monitor 2. Specifically, the markers 8L and 8R each emit, for example, infrared light forward from the monitor 2. Further, the controller 7 is capable of receiving, at a communication section 75, transmission data wirelessly transmitted from the wireless controller module 19 of the game apparatus body 5, to generate a sound or vibration based on the transmission data.

Next, with reference to FIG. 2, an internal structure of the game apparatus body 5 will be described. FIG. 2 is a block diagram illustrating an exemplary structure of the game apparatus body 5. The game apparatus body 5 includes: a CPU (central processing unit) 10; a system LSI (large scale integration) 11; an external main memory 12; a ROM/RTC (read only memory/real time clock) 13; a disc drive 14; an AV-IC (audio video-integrated circuit) 15, and the like.

The CPU 10, serving as a game processor, executes a program stored in the optical disc 4 to perform a process. The CPU 10 is connected to the system LSI 11. In addition to the CPU 10, the external main memory 12, the ROM/RTC 13, the disc drive 14, and the AV-IC 15 are connected to the system LSI 11. The system LSI 11 performs processes such as control of data transmission between the respective components connected thereto, generation of an image to be displayed, and acquisition of data from an external apparatus. An internal structure of the system LSI 11 will be described later. The external main memory 12, which is a volatile memory, stores programs loaded from the optical disc 4 or the flash memory 17, and stores various data. The external main memory 12 is used as a work area and a buffer area for the CPU 10. The ROM/RTC 13 includes a ROM (so-called boot ROM) incorporating a program for booting the game apparatus body 5, and a clock circuit (RTC) for counting time. The disc drive 14 reads, from the optical disc 4, program data, texture data and the like, and writes the read data into an internal main memory 35 described below or the external main memory 12.

The system LSI 11 includes an input/output processor 31, a GPU (Graphics Processor Unit) 32, a DSP (Digital Signal Processor) 33, a VRAM (Video RAM) 34, and the internal main memory 35. These components 31 to 35 are connected to each other via an internal bus (not shown).

The GPU 32, which is a part of rendering means, generates an image in accordance with a graphics command (draw command) given from the CPU 10. The VRAM 34 stores data (such as polygon data and texture data) required for the GPU 32 to execute the graphics command. When an image is generated, the GPU 32 generates image data by using the data stored in the VRAM 3.

The DSP 33, serving as an audio processor, generates sound data by using sound data and sound waveform (tone quality) data stored in the internal main memory 35 and the external main memory 12.

The image data and sound data generated as described above are read by the AV-IC 15. The AV-IC 15 outputs the read image data to the monitor 2 via an AV connector 16, and outputs the read sound data to the loudspeakers 2a included in the monitor 2. Thereby, an image is displayed on the monitor 2, and a sound is outputted from the loudspeakers 2a.

The input/output processor (I/O processor) 31 executes data reception and transmission with the components connected thereto, and download of data from an external apparatus. The I/O processor 31 is connected to the flash memory 17, the wireless communication module 18, the wireless controller module 19, an extension connector 20, and an external memory card connector 21. An antenna 22 is connected to the wireless communication module 18, and an antenna 23 is connected to the wireless controller module 19.

The I/O processor 31 is connected to a network via the wireless communication module 18 and the antenna 22 so as to communicate with another game apparatus or various servers connected to the network. The I/O processor 31 accesses the flash memory 17 at regular intervals so as to detect for data to be transmitted to the network. When data to be transmitted is detected, the I/O processor 31 transmits the data to the network via the wireless communication module 18 and the antenna 22. Further, the I/O processor 31 receives, via the network, the antenna 22 and the wireless communication module 18, data transmitted from other game apparatus or data downloaded from a download server, and stores the received data in the flash memory 17. The CPU 10 executes a program to read the data stored in the flash memory 17 to use the data for execution of the program. The flash memory 17 may store not only the data transmitted and received between the game apparatus body 5 and other game apparatus or various servers, but also saved data (result data or progress data of the process) of the game played with the game apparatus body 5.

The I/O processor 31 receives, via the antenna 23 and the wireless controller module 19, operation data or the like transmitted from the controller 7 and/or the board type controller 9, and (temporarily) stores the data in a buffer area of the internal main memory 35 or the external main memory 12. Similarly to the external main memory 12, the internal main memory 35 may store a program loaded from the optical disc 4 or a program loaded from the flash memory 17, and various data. The internal main memory 35 may also be used as a work area or buffer area for the CPU 10.

The I/O processor 31 is connected to the extension connector 20 and the external memory card connector 21. The extension connector 20, which is a connector used for interface such as a USB and an SCSI, allows communication with the network, without using the wireless communication module 18, by connecting, to the extension connector 20, a media such as an external storage medium, or a peripheral device such as another controller, or a wired communication connector. The external memory card connector 21 is a connector for connecting to the external memory card connector 21 the external storage medium such as a memory card. For example, the I/O processor 31 accesses the external storage medium via the extension connector 20 or the external memory card connector 21, to store data in the external storage medium or read data from the external storage medium.

The game apparatus body 5 includes (on the front main surface thereof, for example) a power button 24 of the game apparatus body 5, a reset button 25 for a game process, an insertion slot in which the optical disc 4 is inserted, an eject button 26 for ejecting the optical disc 4 from the insertion slot of the game apparatus body 5, and the like. The power button 24 and the reset button 25 are connected to the system LSI 11. When the power button 24 is turned on, the respective components of the game apparatus body 5 are supplied with power via an AC adapter (not shown). When the reset button 25 is pressed, the system LSI 11 re-executes the boot program of the game apparatus body 5. The eject button 26 is connected to the disc drive 14. When the eject button 26 is pressed, the optical disc 4 is ejected from the disc drive 14.

Figure 3:
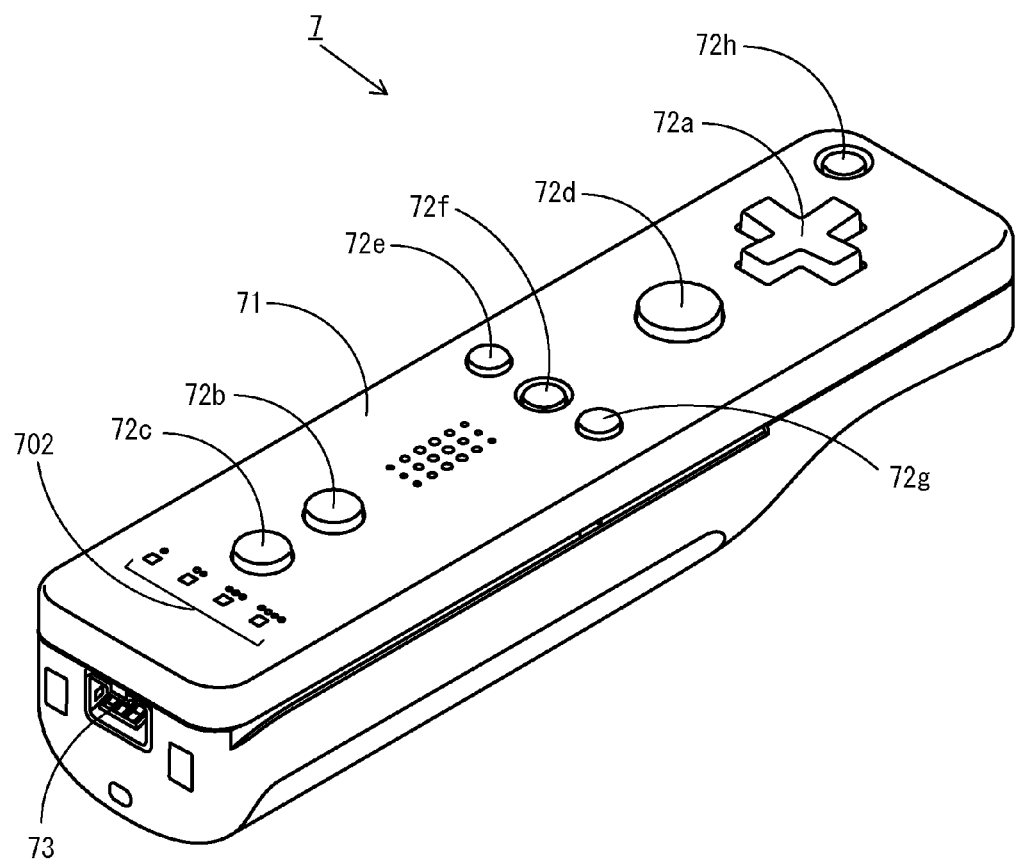
FIG. 3 is a perspective view of an example of a non-limiting controller 7 shown in FIG. 1 as viewed from the top rear surface thereof.

With reference to FIGS. 3 and 4, the controller 7 will be described. FIG. 3 is a perspective view of the controller 7 as viewed from the top rear surface thereof. FIG. 4 is a perspective view of the controller 7 as viewed from the bottom front surface thereof.

As shown in FIGS. 3 and 4, the controller 7 includes a housing 71 which is formed by, for example, plastic molding, and has a plurality of operation sections 72 in the housing 71. The housing 71 has a substantially parallelepiped shape extending in a longitudinal direction from front to rear. The overall size of the housing 71 is small enough to be held by one hand of an adult or even a child.

On the center of the front portion of the top surface of the housing 71, a cross key 72a is provided. The cross key 72a is a cross-shaped four-direction push switch. The cross key 72a includes operation portions corresponding to the four directions (front, rear, right and left), which are located on cross-shaped projecting portions, respectively, arranged at intervals of 90 degrees. A user selects one of the upward, downward, rightward, and leftward (the front, rear, right and left) directions by pressing a corresponding one of the operation portions of the cross key 72a. Through an operation on the cross key 72a, the user can, for example, indicate a direction in which an object or the like appearing in a virtual world is to move or select one of a plurality of options.

Although the cross key 72a is an operation section for outputting an operation signal in accordance with the aforementioned direction input operation performed by the user, such an operation section may be provided in another form. For example, the cross key 72a may be replaced with an operation section, including four push switches corresponding to directions, respectively, represented by a cross, for outputting an operation signal in accordance with the push switch having been pressed by the user. Alternatively, the cross key 72a may be replaced with an operation section including the aforementioned four push switches and a center switch provided at the center of the cross formed by the four push switches. Alternatively, the cross key 72a may be replaced with an operation section which includes an inclinable stick (so-called a joystick) projecting from the top surface of the housing 71 and outputs an operation signal in accordance with the inclining direction of the stick. Still alternatively, the cross key 72a may be replaced with an operation section which includes a disc-shaped member horizontally slidable and outputs an operation signal in accordance with the sliding direction of the disc-shaped member. Still alternatively, the cross key 72a may be replaced with a touch pad.

Behind the cross key 72a on the top surface of the housing 71, a plurality of operation buttons 72b, 72c, 72d, 72e, 72f and 72g are provided. The operation buttons 72b, 72c, 72d, 72e, 72f and 72g are operation sections for outputting operation signals assigned to the operation buttons 72b, 72c, 72d, 72e, 72f and 72g, respectively, when the user presses a head thereof. For example, the operation buttons 72b, 72c, and 72d are assigned with functions of a first button, a second button, and an A button, for example. Further, the operation buttons 72e, 72f and 72g are assigned with functions of a minus button, a home button and a plus button, for example. The operation buttons 72a, 72b, 72c, 72d, 72e, 72f and 72g are assigned with various operation functions in accordance with the program executed by the game apparatus body 5. In an exemplary arrangement shown in FIG. 3, the operation buttons 72b, 72c and 72d are arranged in a line at the center in the front-rear direction on the top surface of the housing 71. The operation buttons 72e, 72f and 72g are arranged in a line in the left-right direction between the operation buttons 72b and 72d on the top surface of the housing 71. The operation button 72f has a top surface thereof embedded in the top surface of the housing 71, so as not to be inadvertently pressed by the user.

In front of the cross key 72a on the top surface of the housing 71, an operation button 72h is provided. The operation button 72h is a power switch for remote-controlling the power of the game apparatus body 5 to be on or off. The operation button 72h also has a top surface thereof embedded in the top surface of the housing 71, so as not to be inadvertently pressed by the user.

Behind the operation button 72c on the top surface of the housing 71, a plurality of LEDs 702 is provided. The controller 7 is assigned a controller type (number) so as to be distinguishable from the other controllers 7. For example, the LEDs 702 are used for informing the user of the controller type which is currently set to controller 7 that he/she is using. Specifically, a signal for lighting up one of the plurality of LEDs 702, which corresponds to the controller type, is transmitted from the wireless controller module 19 to the controller 7.

On the top surface of the housing 71, a sound hole for outputting a sound from a loudspeaker (loudspeaker 706 shown in FIG. 5) described below is formed between the operation button 72b and the operation buttons 72e, 72f, and 72g.

On the bottom surface of the housing 71, a recessed portion is formed. The recessed portion is formed at a position at which an index finger or middle finger of the user is located when the user holds the controller 7 with one hand so as to orient the front surface thereof to the markers 8L and 8R. On a slope surface of the recessed portion on the bottom surface of the housing 71, an operation button 72i is provided. The operation button 72i is an operation section acting as, for example, a B button.

On the front surface of the housing 71, an image pickup element 743 included in the imaging information calculation section 74 is provided. The imaging information calculation section 74 is a system for analyzing image data taken by the controller 7 and detecting the position of the center of gravity, the size and the like of an area having a high brightness in the image data. The imaging information calculation section 74 has, for example, a maximum sampling period of about 200 frames/second, and therefore can trace and analyze even a relatively fast motion of the controller 7. The imaging information calculation section 74 will be described below in detail. On the rear surface of the housing 71, the connector 73 is provided. The connector 73 is, for example, an edge connector, and is used for engaging and connecting the controller 7 with, for example, the connection cable.

With reference to FIG. 5, the internal structure of the controller 7 will be described. FIG. 5 is a block diagram illustrating an exemplary structure of the controller 7.

As shown in FIG. 5, the controller 7 includes the operation sections 72, the imaging information calculation section 74, a communication section 75, an acceleration sensor 701, the loudspeaker 706, a sound IC 707, and an amplifier 708.

The imaging information calculation section 74 includes an infrared filter 741, a lens 742, the image pickup element 743 and an image processing circuit 744. The infrared filter 741 allows infrared light to pass therethrough, among light incident on the front surface of the controller 7. The lens 742 collects the infrared light having passed through the infrared filter 741 so as to be emitted to the image pickup element 743. The image pickup element 743 is a solid-state imaging device such as a CMOS sensor or a CCD, and takes an image of the infrared light collected by the lens 742. Therefore, the image pickup element 743 takes an image of the infrared light having passed through the infrared filter 741 to generate the image data. The image data generated by the image pickup element 743 is processed by the image processing circuit 744. Specifically, the image processing circuit 744 processes the image data obtained from the image pickup element 743, identifies a high intensity spot thereof, and outputs, to the communication section 75, process result data representing a position coordinate point and the area size of the identified spot. The imaging information calculation section 74 is secured to the housing 71 of the controller 7. The imaging direction of the imaging information calculation section 74 can be changed by changing the direction of the housing 71.

The process result data outputted from the imaging information calculation section 74 can also be used as operation data representing a position and the like indicated by a core unit 70. For example, the user holds the controller 7 so that the front surface (an entrance side of the light, of which the image is taken by the imaging information calculation section 74) of the controller 7 is oriented toward the monitor 2. On the other hand, the two markers 8L and 8R are provided in the vicinity of the display screen of the monitor 2. The markers 8L and 8R each output infrared light forward from the monitor 2 and an image of each infrared light is to be taken by the imaging information calculation section 74. The game apparatus body 5 uses position data regarding high intensity points by the two markers 8L and 8R to calculate the position indicated by the controller 7.

The acceleration sensor 701 detects a linear acceleration in three directions, i.e., the up/down direction, the left/right direction, and the forward/backward direction. The acceleration sensor 701 may use acceleration detection means which detects for a linear acceleration along at least one axial direction. For example, while the acceleration sensor 701 of an electrostatic capacitance type (capacitance-coupling type) is used, an acceleration detection technology (e.g., piezoelectric type or piezoresistance type) now existing or any other suitable technology developed in the future may be used.

The acceleration detection means, as used in the acceleration sensor 701, are capable of detecting for an acceleration (linear acceleration) along a straight line corresponding to each axis of the acceleration sensor 701. In other words, the direct output from the acceleration sensor 701 is limited to signals indicative of linear acceleration (static or dynamic) along each of the three axes thereof. As a result, the acceleration sensor 701 cannot directly detect movement along a non-linear (e.g. arcuate) path, rotation, rotational movement, angular displacement, tilt, position, attitude or any other physical characteristic. However, when a computer such as a processor (for example, the CPU 10) of the game apparatus or a processor (for example, a microcomputer 751) of the controller 7 performs a process based on an acceleration signal outputted from the acceleration sensor 701, additional information relating to the controller 5 can be inferred or calculated (determined), as one skilled in the art will readily understand.

The communication section 75 includes the microcomputer 751, a memory 752, a wireless module 753 and an antenna 754. The microcomputer 751 controls the wireless module 753 for wirelessly transmitting the transmission data while using the memory 752 as a storage area during the processing. The microcomputer 751 controls an operation of the sound IC 707 based on the data from the game apparatus body 5 received by the wireless module 753 via the antenna 754. The sound IC 707 processes the sound data and the like transmitted from the game apparatus body 5 via the communication section 75.

Data from the controller 7 including an operation signal (key data) from the operation sections 72, three-axial direction acceleration signals (X, Y, and Z-axial direction acceleration data) from the acceleration sensor 701, and the process result data from the imaging information calculation section 74 are outputted to the microcomputer 751. The microcomputer 751 temporarily stores the respective input data (the key data, the X, Y, and Z-axial direction acceleration data, and process result data) in the memory 752 as the transmission data which is to be transmitted to the wireless controller module 19. The wireless transmission from the communication section 75 to the wireless controller module 19 is performed periodically at predetermined time intervals. Since game processing is generally performed at a cycle of 1/60 second, data needs to be transmitted at a cycle of a time period shorter than the cycle of the game processing. Specifically, the game process unit is 16.7 ms (1/60 second), and the transmission interval of the communication section 75 structured using the Bluetooth technology is 5 ms. At a time at which the transmission to the wireless controller module 19 is to be performed, the microcomputer 751 outputs the transmission data stored in the memory 752 as a series of operation information to the wireless module 753. The wireless module 753 uses, for example, the Bluetooth technology to transmit, from the antenna 754, operation information as a radio wave signal by using a carrier wave of a predetermined frequency. Thus, data from the controller 7 including the key data from the operation sections 72, the X, Y, and Z-axial direction acceleration data from the acceleration sensor 701, and the process result data from the imaging information calculation section 74 are transmitted from the controller 7. The wireless controller module 19 of the game apparatus body 5 receives the radio wave signal, and the game apparatus body 5 demodulates or decodes the radio wave signal to obtain the series of operation information (the key data, the X, Y, and Z axial direction acceleration data, and the process result data). Based on the obtained operation information and the program, the CPU 10 of the game apparatus body 5 performs the processing. When the communication section 75 is structured using the Bluetooth (registered trademark) technology, the communication section 75 can includes a function of receiving transmission data which is wirelessly transmitted from another device.

Figure 6:
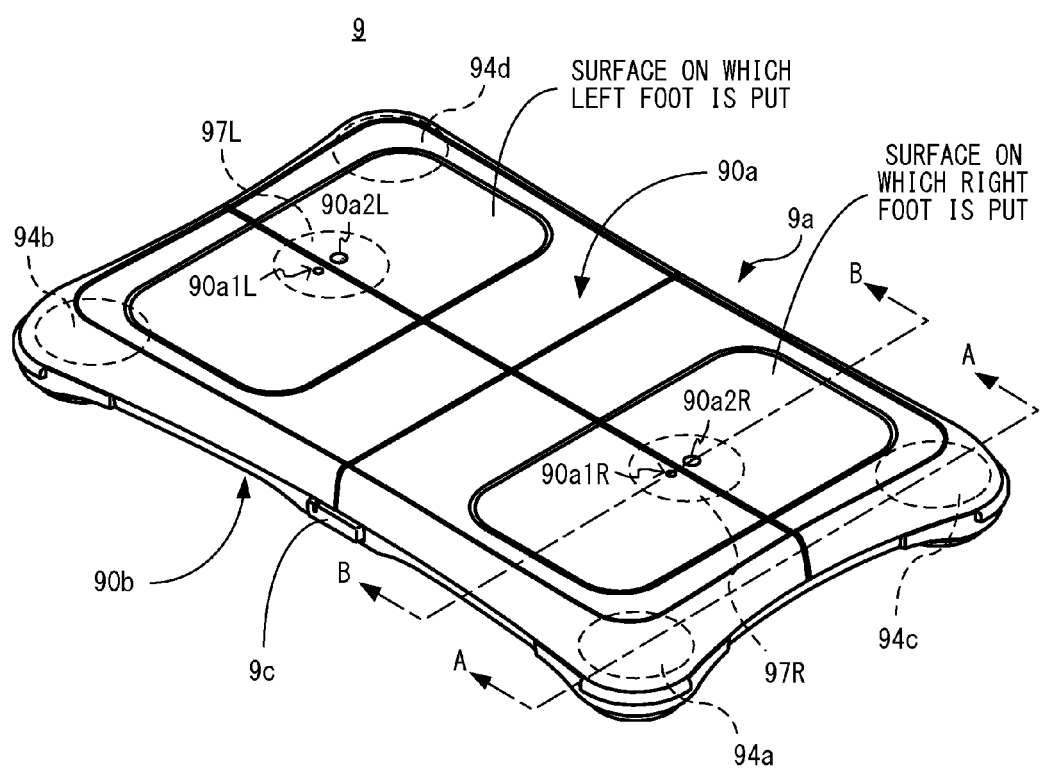
FIG. 6 is a perspective view illustrating an exemplary external view of a non-limiting board type controller 9 shown in FIG. 1.

FIG. 6 is a perspective view illustrating an exemplary external view of the board type controller 9 shown in FIG. 1. As shown in FIG. 6, the board type controller 9 includes a platform 9a on which the user stands on (the user puts his/her feet on), at least four load sensors 94a, 94b, 94c, and 94d for detecting a load applied to the platform 9a, and at least one distance sensor 97 (two distance sensors 97L and 97R in the exemplary embodiment) for detecting distances from the platform 9a to the feet. The load sensors 94a to 94d and the distance sensors 97L and 97R are included within the platform 9a (see FIG. 9) and the locations thereof are shown in FIG. 6 by dotted lines. In the following description, the four load sensors 94a to 94d may be collectively referred to as load sensors 94. In the following description, the two distance sensors 97L and 97R may be collectively referred to as distance sensors 97 as well.

The platform 9a is formed in the shape of substantially a rectangular parallelepiped, and is in the shape of substantially a rectangle as viewed from the top. For example, the short side of the rectangular shape of the platform 9a is approximately 30 cm, and the long side thereof is approximately 50 cm. The upper surface of the platform 9a is flat, and has a pair of surfaces on which the user stands with his/her feet soles contacting thereto. Specifically, the upper surface of the platform 9a has a surface (a far-left region enclosed with a double line in FIG. 6) on which the user's left foot is to be put, and a surface (a front-right region enclosed with a double line in FIG. 6) on which the user's right foot is to be put. The platform 9a has, at four corners thereof, side surfaces each partially projecting outward in a cylindrical shape.

In the platform 9a, the four load sensors 94a to 94d are arranged at predetermined intervals. In the exemplary embodiment, the four load sensors 94a to 94d are arranged on the periphery of the platform 9a, more specifically, at the four corners of the platform 9a, respectively. The intervals of the load sensors 94a to 94d are appropriately set such that the load sensors 94a to 94d can accurately detect the intention of a game operation which is expressed by a manner of applying a load onto the platform 9a by the user.

The distance sensor 97L is arranged below the center of the surface of the platform 9a on which the left foot is to be put. At the center of the surface on which the left foot is to be put, a transmissive region 90a1L and a transmissive region 90a2L are formed. The transmissive region 90a1L allows light such as infrared light, outputted from the distance sensor 97L, to transmit therethrough so as to be radiated toward the space above the surface, and the transmissive region 90a2L allows light reflected from an object in the upper space, among the radiated light, to transmit therethrough so as to be incident on the distance sensor 97L.

The distance sensor 97R is arranged below the center of the surface of the platform 9a on which the right foot is to be put. At the center of the surface on which the right foot is to be put, a transmissive region 90a1L and a transmissive region 90a2L are formed. The transmissive region 90a1L allows light such as infrared light, outputted from the distance sensor 97R, to transmit therethrough so as to be radiated toward the space above the surface, and the transmissive region 90a2L allows light reflected from an object in the upper space, among the radiated light, to transmit therethrough so as to be incident on the distance sensor 97R. For the detection of the position (distance) of an object in the upper space, the distance sensor 97L and the distance sensor 97R, for example, emit the infrared light. The distance sensor 97L and the distance sensor 97R, however, may emit another wave such as an electromagnetic wave or a sound wave. The transmissive regions 90a1L and 90a2L and the transmissive regions 90a1R and 90a2R may be any regions through which waves (for example, infrared light) outputted from the distance sensors 97L and 97R are allowed to transmit, respectively, and may be formed of, for example, any members or holes through which the waves are allowed to transmit.

Figure 7:
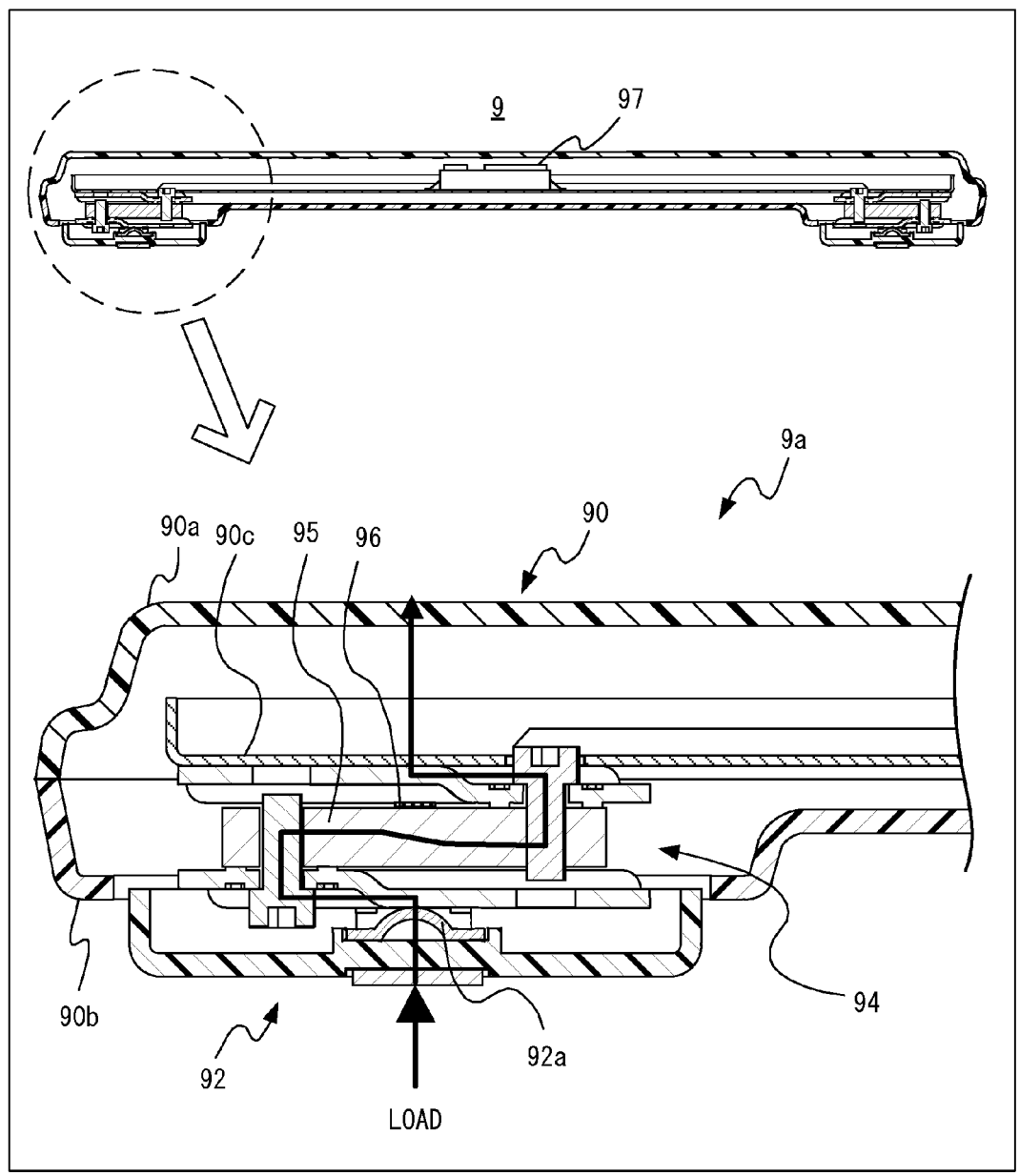
FIG. 7 shows an example of a cross-sectional view of the non-limiting board type controller 9 shown in FIG. 6, taken along a line A-A, and an example of an enlarged view of a corner part where a non-limiting load sensor 94 is arranged.

FIG. 7 shows an example of a cross-sectional view of the board type controller 9 shown in FIG. 6, taken along a line A-A, and an example of an enlarged view of a corner part where a load sensor 94 is arranged. In FIG. 7, the platform 9a includes a support plate 90 on which the user stands, and legs 92. The legs 92 are provided in positions where the load sensors 94a to 94d are provided. In the exemplary embodiment, the four load sensors 94a to 94d are provided at the corresponding four corners. Therefore, the four legs 92 are provided at the four corners. Each leg 92 is formed by plastic molding in the shape of substantially a cylinder with a base. Each load sensor 94 is located on a spherical part 92a provided on the base of the corresponding leg 92. The support plate 90 is supported by the legs 92 via the load sensors 94.

The support plate 90 includes an upper plate 90a forming an upper surface and upper side surface portions, a lower plate 90b forming a lower surface and lower side surface portions, and an intermediate plate 90c provided between the upper plate 90a and the lower plate 90b. The upper plate 90a and the lower plate 90b are formed by, for example, plastic molding, and are integrated using an adhesive or the like. The intermediate plate 90c is, for example, formed of a single metal plate by press forming The intermediate plate 90c is secured onto the four load sensors 94a to 94d. The upper plate 90a has, on a lower surface thereof, a grid-patterned rib (not shown), and is supported by the intermediate plate 90c via the rib. Therefore, when the user stands on the platform 9a, the load is transferred to the four legs 92 via the support plate 90 and the load sensors 94a to 94d. As indicated by arrows in FIG. 7, a reaction from a floor, which is generated by the input load, is transferred from the legs 92 through the spherical parts 92a, the load sensors 94a to 94d and the intermediate plate 90c to the upper plate 90a.

Each load sensor 94 is, for example, a strain gauge (strain sensor) load cell, which is a load converter for converting an input load into an electrical signal. In each load sensor 94, a strain-generating body 95 is deformed according to an input load, resulting in a strain. The strain is converted into a change of electrical resistance and then converted into a change of voltage by a strain sensor 96 attached to the strain-generating body. Therefore, the load sensors 94 output, from output terminals thereof, voltage signals indicating the input load.

The load sensors 94 may be of other types, such as a tuning fork type, a string vibration type, an electrostatic capacitance type, a piezoelectric type, a magnetostrictive type, and a gyroscopic type.

Figure 8:
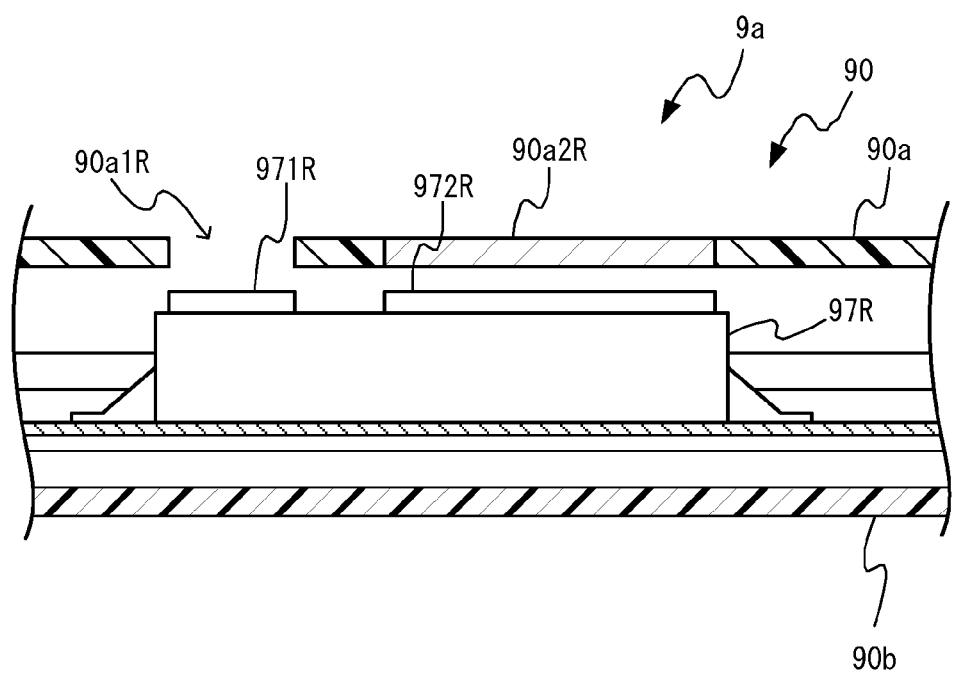
FIG. 8 shows an example of a partially enlarged cross-sectional view of the non-limiting board type controller 9 shown in FIG. 6, taken along a line B-B.

FIG. 8 shows an example of a partially enlarged cross-sectional view of the board type controller 9 shown in FIG. 6, taken along a line B-B, and an enlarged view of an area where the distance sensor 97R is arranged. As shown in FIG. 8, the distance sensor 97R is secured on the intermediate plate 90c below the center of the surface of the upper plate 90a on which the right foot is to be put. The distance sensor 97R includes a light radiation section 971R for radiating light, such as infrared light, to the upper plate 90a side, and a light receiver 972R for receiving light reflected from an object in the space above the upper plate 90a. As one example, the light radiation section 971R includes an infrared LED radiating the infrared light to the upper plate 90a side and the light receiver 972R includes a PSD (position sensing detector) for detecting a position at which the infrared light is received. The transmissive region 90a1R (for example, a hole) is formed in the upper plate 90a at a position directly above the light radiation section 971R, and the transmissive region 90a2R (for example, a surface material having an infrared light transmissive member) is formed in the upper plate 90a at a position directly above the light receiver 972R. The light radiation section 971R may be a light-emitting element such as an LED or a laser, in addition to the infrared LED. The light receiver 972R may be a light-receiving element such as a CCD or photodiodes, in addition to the PSD. The distance sensor 97L is secured below the center of the surface of the upper plate 90a on which the left foot is to be put. Because the structure and location of the distance sensor 97L are similar to those of the above-described distance sensor 97R, the detailed description thereof is omitted.

When the user stands on the platform 9a, the left foot is put near the center of the surface of the upper plate 90a on which the left foot is to be put and the right foot is put near the center of the surface of the upper plate 90a on which the right foot is to be put. Thus, the transmissive regions 90a1L and 90a2L are provided in positions directly below the user's left foot, and the transmissive regions 90a1R and 90a2R are provided at positions directly below the user's right foot. When the user standing on the platform 9a raises his/her left foot, the distance sensor 97L detects the position of the left foot (a distance from the board type controller 9 to the left foot, to be accurate, a distance from the distance sensor 97L to the left foot in a direction perpendicular to the upper surface of the platform 9a). When the user standing on the platform 9a raises his/her right foot (see FIG. 10), the distance sensor 97R detects the position of the right foot (a distance from the board type controller 9 to the right foot, to be accurate, a distance from the distance sensor 97R to the right foot in the direction perpendicular to the upper surface of the platform 9a).

Specifically, the distance sensors 97L and 97R detect positions of reflected light from detection objects (the user's left foot and right foot) incident on the light receivers 972L and 972R, respectively, to detect distances between the detection objects and the distance sensors 97L and 97R, based on the triangulation using changing of the respective positions in accordance with the distances. As one example, the distance sensors 97L and 97R output signals having different voltages, in accordance with the distances to the corresponding detection objects. Thus, the distance sensors 97L and 97R can output, from the respective output terminals, voltage signals indicative of the distances to the corresponding detection objects.

Referring back to FIG. 6, the board type controller 9 further includes a power button 9c. When the power button 9c is operated (e.g., when the power button 9c is pressed) in the state where the board type controller 9 is not activated, power is supplied to each of circuit components (see FIG. 9) of the board type controller 9. However, there are cases in which the board type controller 9 is powered on in accordance with an instruction from the game apparatus body 5 and thereby supply of power to the circuit components is started. The board type controller 9 may be automatically powered off when a state where the user does not stand thereon continues for a predetermined period of time (e.g., 30 second) or longer. Further, when the power button 9c is again operated in the state where the board type controller 9 is in active, the board type controller 9 may be powered off to stop supply of power to the circuit components.

Figure 9:
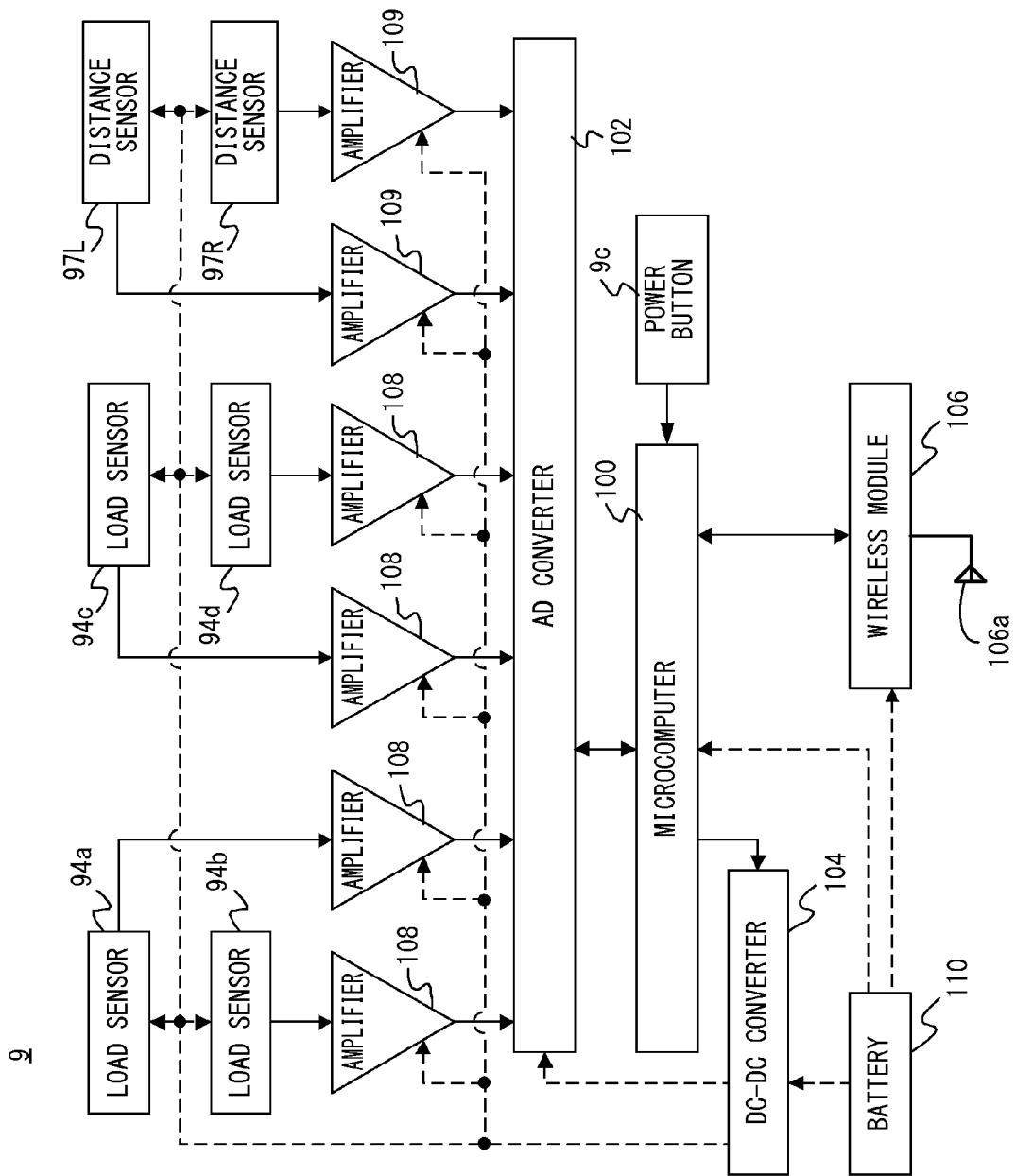
FIG. 9 is a block diagram showing an example of a non-limiting electrical configuration of the board type controller 9 shown in FIG. 1.

FIG. 9 is a block diagram showing an example of an electrical configuration of the board type controller 9. In FIG. 9, flows of signals and data are indicated by solid arrows, and supply of power is indicated by dotted arrows.

The board type controller 9 includes a microcomputer 100 for controlling the operation thereof The microcomputer 100 includes a CPU, a ROM, a RAM, and the like, which are not shown. The CPU controls the operation of the board type controller 9 in accordance with a program stored in the ROM.

The power button 9c, an AD converter 102, a DC-DC converter 104, and a wireless module 106 are connected to the microcomputer 100. An antenna 106a is connected to the wireless module 106. The four load sensors 94a to 94b are connected to the AD converter 102 via amplifiers 108, respectively. The two distance sensors 97L and 97R are connected to the AD converter 102 via amplifiers 109, respectively.

Further, the board type controller 9 includes a battery 110 for supplying power to the circuit components. In another exemplary embodiment, an AC adapter may be connected to the board type controller 9 instead of the battery 110 so that commercial power is supplied to the circuit components. In this case, instead of the DC-DC converter 104, a power circuit, which converts alternating current into direct current and lowers and rectifies a direct-current voltage, may be provided in the board type controller 9. In the exemplary embodiment, power is supplied directly from the battery 110 to the microcomputer 100 and the wireless module 106. In other words, power is constantly supplied from the battery 110 to the wireless module 106 and some components (such as the CPU) in the microcomputer 100 to detect whether the power button 9c is turned on and whether a command that instructs power-on is transmitted from the game apparatus body 5. On the other hand, power is supplied from the battery 110 through the DC-DC converter 104 to the load sensors 94a to 94d, the distance sensors 97L and 97R, the AD converter 102, and the amplifiers 108 and 109. The DC-DC converter 104 converts a voltage value of direct current supplied from the battery 110 into a different voltage value, and supplies the resultant direct current to the load sensors 94a to 94d, the distance sensors 97L and 97R, the AD converter 102, and the amplifiers 108 and 109.

Supply of power to the load sensors 94a to 94d, the distance sensors 97L and 97R, the A/D converter 102 and the amplifiers 108 and 109 may be performed according to need by the microcomputer 100 controlling the DC-DC converter 104. Specifically, when it is determined that the load sensors 94a to 94d need to be operated to detect a load or that the distance sensors 97L and 97R need to be operated to detect distances to the detection objects, the microcomputer 100 may control the DC-DC converter 104 to supply power to at least one of: the load sensors 94a to 94d; the distance sensors 97L and 97R; the A/D converter 102; and the amplifiers 108 and 109.

When power is supplied to the load sensors 94a to 94d, the load sensors 94a to 94d each output a signal indicative of a load inputted thereto. When power is supplied to the distance sensors 97L and 97R, the distance sensors 97L and 97R each output a signal indicative of a distance to a corresponding detection object. These signals are amplified by the respective amplifiers 108 or 109, and converted from analog signals into digital data by the A/D converter 102. The digital data is inputted to the microcomputer 100. The detected values of the load sensors 94a to 94d are given identification information of the load sensors 94a to 94d, so that the load sensors 94a to 94d can be identified from the corresponding detected values. The detected values of the distance sensors 97L and 97R are given identification information of the distance sensors 97L and 97R, so that the distance sensors 97L and 97R can be identified from the corresponding detected values. Thus, the microcomputer 100 can obtain the data representing the detected load values of the four load sensors 94a to 94d and the detected distance values of the two distance sensors 97L and 97R at the same time.

On the other hand, when it is determined that the load sensors 94a to 94d, and the distance sensors 97L and 97R, and the like are not needed to be operated, i.e., when it is not the time for load detection nor distance detection, the microcomputer 100 controls the DC-DC converter 104 to stop supply of power to the load sensors 94a to 94d, the distance sensors 97L and 97R, the A/D converter 102, and the amplifiers 108 and 109. Thus, the board type controller 9 can operate the load sensors 94a to 94d to detect a load or operate the distance sensors 97L and 97R to detect a distance only when it is required, resulting in a reduction in power consumption for load detection and distance detection.

Load detection or distance detection is typically required when the game apparatus body 5 (FIG. 1) needs to obtain load data or distance data. For example, when game apparatus body 5 requires load information or distance information, the game apparatus body 5 transmits an information acquisition command to the board type controller 9. When the microcomputer 100 receives the information acquisition command from the game apparatus body 5, the microcomputer 100 controls the DC-DC converter 104 to supply power to the load sensors 94a to 94d, the distance sensors 97L and 97R, and the like to detect a load or distance. On the other hand, when the microcomputer 100 does not receive a load acquisition command from the game apparatus body 5, the microcomputer 100 controls the DC-DC converter 104 to stop supply of power to the load sensors 94a to 94d, the distance sensors 97L and 97R, and the like.

The microcomputer 100 may control the DC-DC converter 104 based on a determination that load detection timing and distance detection timing occur at predetermined intervals. When such periodic load detection and distance detection are performed, information regarding the constant time period may be supplied from the game apparatus body 5 to the microcomputer 100 of the board type controller 9 and stored therein when the game is started, or it may be preinstalled in the microcomputer 100.

The data representing the detected values from the load sensors 94a to 94d or data representing the detected values from the distance sensors 97L and 97R are transmitted as operation data (input data) for the board type controller 9 from the microcomputer 100 via the radio module 106 and an antenna 106b to the game apparatus body 5. For example, when the microcomputer 100 has performed load detection and distance detection according to a command from the game apparatus body 5, the microcomputer 100 transmits the detected value data of the load sensors 94a to 94d and the detected value data of the distance sensors 97L and 97R to the game apparatus body 5 on receipt of the detected value data from the A/D converter 102. The microcomputer 100 may transmit the detected value data to the game apparatus body 5 at predetermined intervals. If the interval of the data transmission is longer than the intervals of the load and distance detections, data containing load values and distance values which have been detected at a plurality of detection timings up to the next transmission timing may be transmitted.

The wireless module 106 is set so as to perform communication according to the same wireless standard (the Bluetooth, wireless LAN, and the like) as that for the wireless controller module 19 of the game apparatus body 5. Accordingly, the CPU 10 of the game apparatus body 5 is allowed to transmit an information acquisition command to the board type controller 9 through the wireless controller module 19 and the like. Thus, the board type controller 9 is allowed to receive the command from the game apparatus body 5 through the wireless module 106 and the antenna 106a. Further, the board type controller 9 is allowed to transmit the operation data including the load detection values (or load calculation values) of the load sensors 94a to 94d and the distance detection values (or detection calculation values) of the distance sensors 97L and 97R to the game apparatus body 5.

For example, in a game which is executed based on a simple sum of four load values detected by the four load sensors 94a to 94d, maximum values, minimum values, and average values of the two distances detected by the two distance sensors 97L and 97R, and the like, the user is allowed to stand at any position with respect to the four load sensors 94a to 94d and the two distance sensors 97L and 97R of the board type controller 9. That is, the user is allowed to stand on the platform 9a at any position and in any direction to play a game. In some kinds of games, however, the direction of a load value detected by each of the four load sensors 94 viewed from the user and a foot of a distance value detected by each of the two distance sensors 97 may be identified. That is, a positional relation between the four load sensors 94 and the two distance sensors 97 of the board type controller 9 and the user may be recognized. In this case, for example, the positional relation between the four load sensors 94, the two distance sensors 97, and the user may be previously defined, and the user may be supposed to stand on the platform 9a in a manner which allows the predetermined positional relation. Typically, a positional relation in which two of the load sensors 94a to 94d are present in front of, behind, to the right of, and to the left of the user standing on the center of the platform 9a and the distance sensor 97L is present directly below the user's left foot, and the distance sensor 97R is present directly below user's right foot, i.e., a positional relation in which the user stands on the center of the platform 9a of the board type controller 9, is defined. In this case, the platform 9a of the board type controller 9 is formed in a rectangular shape as viewed from the top, and the power button 9c is provided at one side (long side) of the rectangle in the exemplary embodiment. Therefore, it is previously ruled that the user, using the power button 9c as a guide, stands on the platform 9a such that the long side at which the power button 9c is provided is located in a predetermined direction (front, rear, left or right). In this case, each of the load values detected by the load sensors 94a to 94d is a load value of a predetermined direction (front right, front left, rear right, or rear left) as viewed from the user and the distance values detected by the distance sensors 97L and 97R are respective distances to the user's left foot and right foot. Therefore, the board type controller 9 and the game apparatus body 5 can find out a direction to which each detected load value corresponds as viewed from the user and find out the user's foot to which each detected distance value corresponds to, based on the identification information of the load sensors 94 contained in the detected load value data, the identification information of the distance sensors 97 contained in the detected distance value data, and arrangement data representing previously set (stored) positions or directions of the load sensors 94 and the distance sensors 97 with respect to the user. As a result, it is possible to understand the intention of a game operation performed by the user, such as an operating direction, for example, forward, backward, rightward, or leftward direction, or a user's foot being raised.

Figure 10:
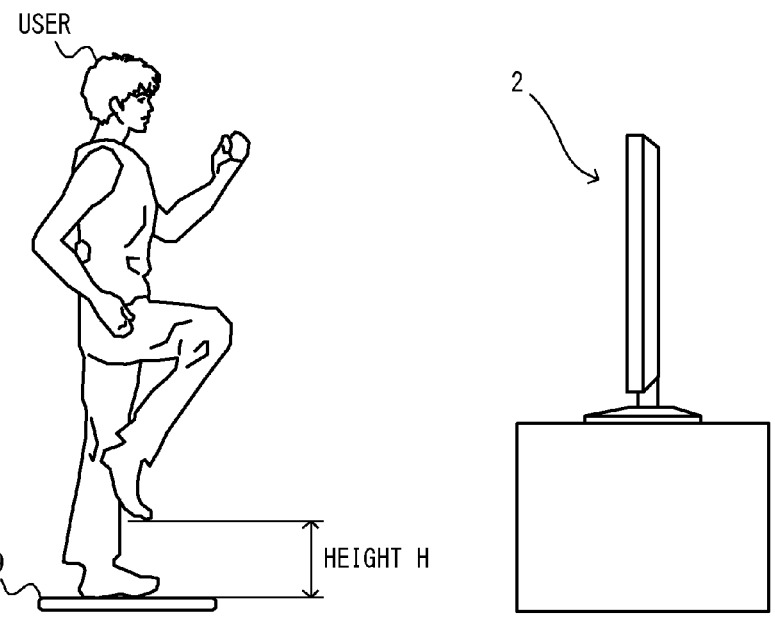
FIG. 10 is a diagram showing an example of a non-limiting state of a user playing a game using the board type controller 9 shown in FIG. 1.
Figure 11:
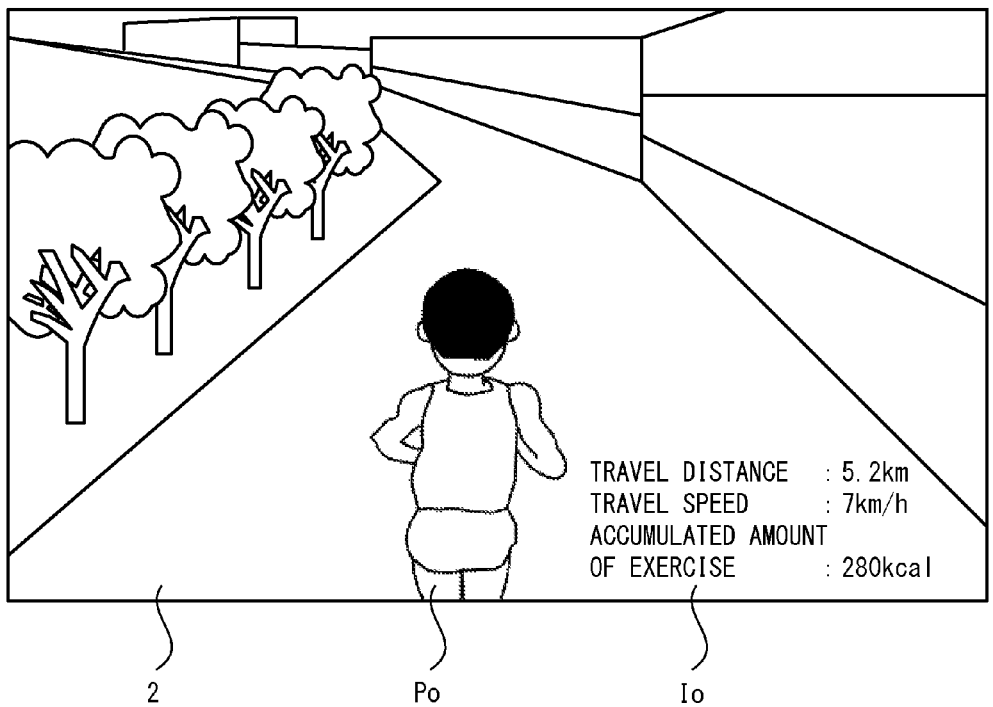
FIG. 11 is a diagram illustrating an example of a non-limiting image displayed on the monitor 2 shown in FIG. 1.

Next, an outline of information processing performed on the game apparatus body 5 will be described with reference to FIGS. 10 and 11 before a specific description of processes performed by the game apparatus body 5 is given. FIG. 10 is a diagram showing an example of a user performing an operation using the board type controller 9. FIG. 11 is a diagram illustrating an example of an image displayed on the monitor 2.

As shown in FIG. 10, for the operation using the board type controller 9 in the game system 1, the user moves the feet up and down (action such as, walk, run, jump, raise thighs, dance on the board type controller 9) on the board type controller 9 while seeing a player object Po displayed on the monitor 2. On the other hand, as shown in FIG. 11, the player object Po moving in the virtual world is displayed on the monitor 2 and an image is given in which the player object Po moves in the virtual world in accordance with the user's action on the board type controller 9. As one example, in FIG. 11, the player object Po walking, jogging, or running in the virtual world is displayed. The user steps in place on the board type controller 9 as if walking, jogging, or running. In this case, the player object Po moves in the virtual world at a speed according to the steps of the user stepping in place or the heights H to which the user raises the feet.

For example, as described above, detected load values and detected distance values based on the user's action on the board type controller 9 are outputted from the board type controller 9. The player object Po displayed on the monitor 2 moves in the virtual world, according to the detected load values and/or the detected distance values. As one example, the height H from the board type controller 9 to the raised user's foot is calculated based on the detected distance values, and the player object Po performs an action in the virtual world such as walking or running as raising its feet according to the heights H. In addition, the steps of the user and the height H obtained each time the user raises each foot are sequentially calculated based on the detected load values and/or the detected distance values. On the basis of the steps and the height H, a travel speed, a travel distance, an accumulated amount of exercise, and the like of the player object Po in the virtual world are calculated and displayed (exercise information Io). The "accumulated amount of exercise" described herein indicates an amount of physical activity (energy consumption) at exercise, which is an increase in metabolic load that is consumed by physical activity on the board type controller 9 such as stepping in place, pretending running and walking motions. For example, the "accumulated amount of exercise" is a parameter corresponding to energy consumption which is generally indicated the measure thereof in "kilocalorie (kcal)". The calculated travel speed, travel distance, accumulated amount of exercise, and the like of the player object Po are based on the actual user's action and thus, can be displayed in close association with the travel speed, travel distance, and accumulated amount of exercise of the user.

Figure 12:
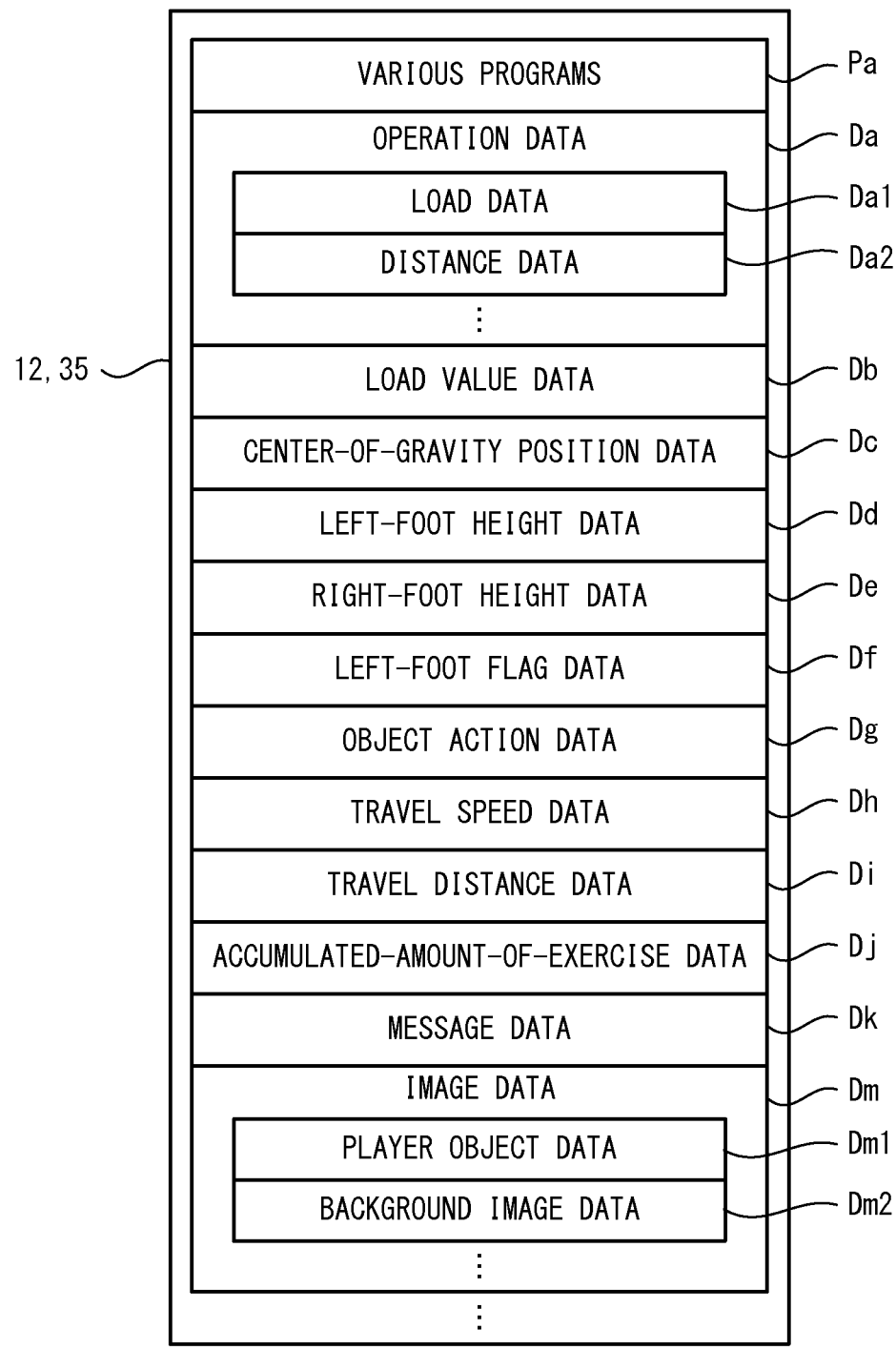
FIG. 12 is a diagram illustrating an example of non-limiting main data and programs stored in a main memory of the game apparatus body 5 shown in FIG. 1.

Next, a process performed by the game system 1 will be described in detail. First, main data used in the process will be described with reference to FIG. 12. FIG. 12 is a diagram illustrating an example of main data and programs stored in the external main memory 12 and/or the internal main memory 35 (hereinafter, these two main memories are collectively referred to as a main memory) of the game apparatus body 5.

As shown in FIG. 12, in a data storage area of the main memory, operation data Da, load value data Db, center-of-gravity position data Dc, left-foot height data Dd, right-foot height data De, left-foot flag data Df, object action data Dg, travel speed data Dh, travel distance data Di, accumulated-amount-of-exercise data Dj, message data Dk, image data Dm, and the like are stored. In addition to the data contained in the information shown in FIG. 12, data used for a process and the like, such as data of other objects displayed on the monitor 2 are optionally stored in the main memory. In a program storage area of the main memory, various programs Pa constituting an information processing program are stored.

As the operation data Da, a series of operation information transmitted as transmission data from the controller 7 or the board type controller 9 is stored and updated to the latest operation data. For example, the operation data Da includes load data Da1, distance data Da2, and the like. The load data Da1 is data representing load values detected by the load sensors 94a to 94d of the board type controller 9. The distance data Da2 is data representing distance values detected by the distance sensors 97L and 97R of the board type controller 9.

The wireless controller module 19 of the game apparatus body 5 receives the data (for example, data representing the detected load values and data representing the detected distance values) included in the operation information transmitted from the controller 7 or the board type controller 9 at predetermined time intervals (for example, every 1/200 seconds), and stores the received data in a buffer, not shown, of the wireless controller module 19. Thereafter, the data stored in the buffer is read every one frame (for example, every 1/60 seconds) corresponding to a processing cycle, and the operation data Da (for example, the load data Da1 and the distance data Da2) in the main memory is updated.

At this time, since the cycle of receiving the operation information is different from the processing cycle, a plurality of pieces of information received at a plurality of timings are stored in the buffer. In the game process described below, only the latest piece of operation information among the plurality of pieces of operation information received at a plurality of timings is used or all pieces of operation information received at a plurality of timings are used in respective steps of the game process, and the steps are progressed successively.

In the game process flow described below, the load data Da1 and the distance data Da2 are updated every one frame corresponding to the processing cycle. However, the load data Da1 and the distance data Da2 may be updated based on another processing cycle. For example, the load data Da1 and the distance data Da2 may be updated based on the cycle of the transmission from the board type controller 9, and the load data Da1 and the distance data Da2 having been updated may be used based on the processing cycle. In this case, the cycle for updating the load data Da1 and the distance data Da2 is different from the other processing cycle.

The load value data Db is an aggregate of data each representing a load value detected by the board type controller 9. For example, the load value data Db is an aggregate of data each representing a sum of load values (total load value) detected by the load sensors 94a to 94d. Specifically, the load value data Db is an array of data each representing the total load value within a predetermined period, which is calculated time-sequentially, and the data representing the total load value is time-sequentially stored in each element of the array.

The center-of-gravity position data Dc is an aggregate of data each representing a center-of-gravity position of a load applied to the board type controller 9. For example, the center-of-gravity position data Dc is an aggregate of data each representing a position of center of gravity which is calculated based on the load values detected by the respective load sensors 94a to 94d by using a predetermined mathematical equation. Specifically, the center-of-gravity position data Dc is an array of data each representing the above-mentioned center-of-gravity position within a predetermined period, which is calculated time-sequentially, and the data representing the center-of-gravity position is time-sequentially stored in each element of the array.

The left-foot height data Dd is an aggregate of data each representing the height H (see FIG. 10) to which the user raises his/her left foot on the board type controller 9. For example, the left-foot height data Dd is an aggregate of data each representing the height H calculated based on the distance value detected by the distance sensor 97L. Specifically, the left-foot height data Dd is an array of data each representing the height H of the left foot within a predetermined time period, which is calculated time-sequentially, and the data representing the height H of the left foot is time-sequentially stored in each element of the array.

The right-foot height data De is an aggregate of data each representing the height H to which the user raises his/her right foot on the board type controller 9. For example, the right-foot height data De is an aggregate of data each representing the height H calculated based on the distance value detected by the distance sensor 97R. Specifically, the right-foot height data De is an array of data each representing the height H of the right foot within a predetermined time period, which is calculated time-sequentially, and the data representing the height H of the right foot is time-sequentially stored in each element of the array.

The left-foot flag data Df is data representing a left-foot flag which is set to ON when it is determined that the user raises his/her left foot on the board type controller 9 and set to OFF when it is determined that the user raises his/her right foot.

The object action data Dg is data representing actions and positions of the player object Po in the virtual world. The travel speed data Dh is data representing a speed of the player object Po running (walking) in the virtual world. The travel distance data Di is data representing a distance how far the player object Po has run (walked) in the virtual world. The accumulated-amount-of-exercise data Dj is data representing the amount of exercise performed by the player object Po by running (walking) in the virtual.

The message data Dk is data representing messages informed to the user if the calculated height H of the left foot and/or height H of the right foot of the user is less than a threshold value.

The image data Dm includes player object data Dm1, background image data Dm2, and the like. The player object data Dm1 is used for generating a game image including the player object Po positioned in the virtual world. The background image data Dm2 is used for generating a game image including a background positioned in the virtual world.

Figure 13:
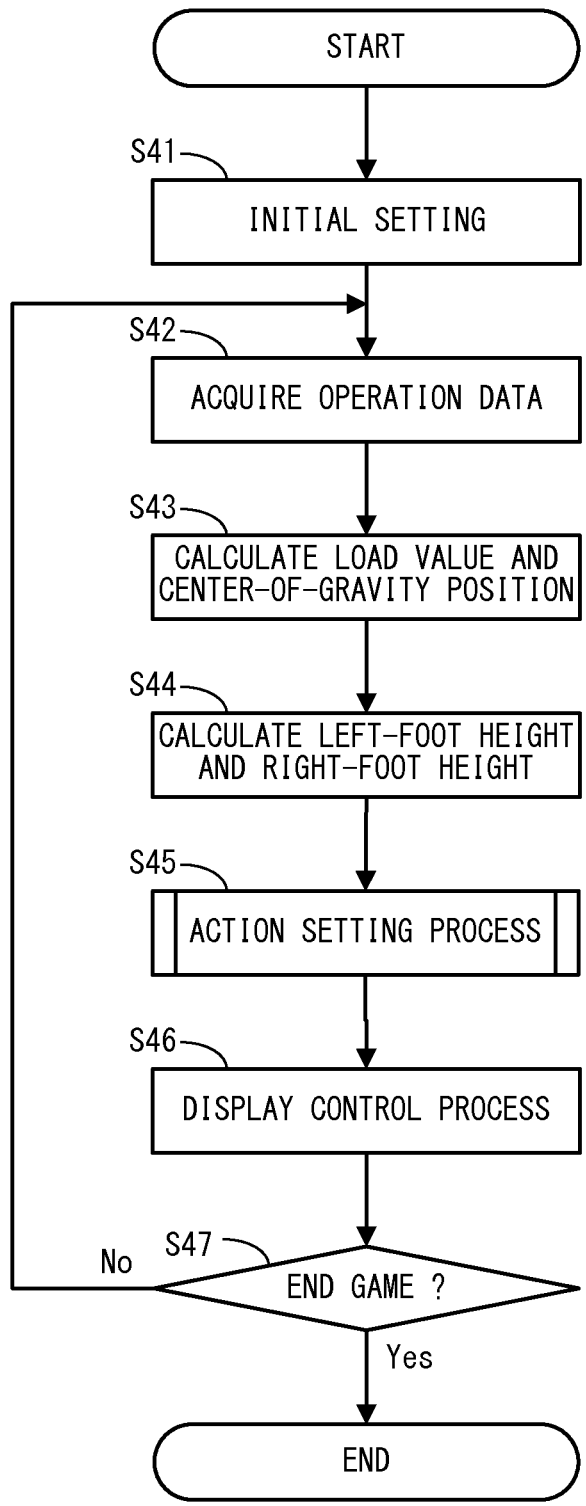
FIG. 13 is a flowchart illustrating an example of a non-limiting process executed by the game apparatus body 5 shown in FIG. 1.
Figure 14:
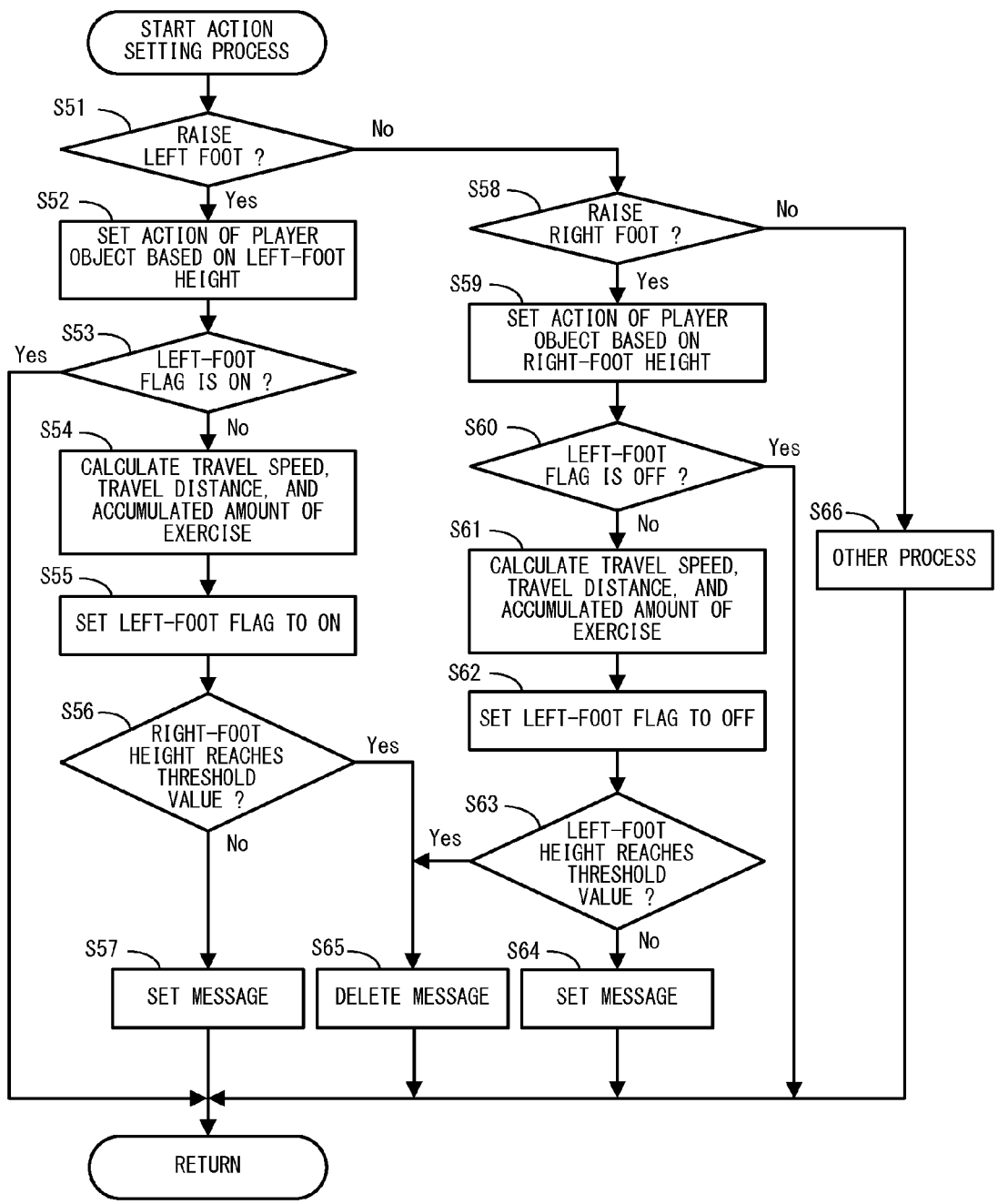
FIG. 14 is a sub-routine illustrating an example of a non-limiting action setting process in step 45 shown in FIG. 13.

Next, a process performed by the game apparatus body 5 will be described in detail with reference to FIGS. 13 and 14. FIG. 13 is a flowchart illustrating an example of a process executed by the game apparatus body 5. FIG. 14 is a sub-routine illustrating an example of an action setting process in step 45 in FIG. 13. In the flowcharts shown in FIGS. 13 and 14, process steps for causing the player object Po to move and displaying the same, in accordance with an operation performed by a user using the board type controller 9 will be mainly described among the whole process, while detailed description of other process steps, which do not directly relate to the exemplary embodiment is not given. Further, in FIGS. 13 and 14, each of the steps executed by the CPU 10 is abbreviated as "S".

When the game apparatus body 5 is powered on, the CPU 10 of the game apparatus body 5 executes a boot program stored in the ROM/RTC 13 to initialize each unit such as the main memory. Then, the information processing program stored in the optical disc 4 is loaded to the main memory, and the CPU 10 starts the execution of the program. The flowcharts shown in FIGS. 13 and 14 show process steps to be performed after the above-mentioned process steps are completed.

As shown in FIG. 13, the CPU 10 performs an initial setting for the process (step 41) and proceeds to the next step. For example, in the initial setting in step 41, the CPU 10 performs settings of the virtual world, such as initial settings of the arrangement and a posture of the player object Po, to update the object action data Dg, and the like. In the initial setting in step 41, other parameters are initialized to perform the following information processing. For example, the CPU 10 initializes parameters indicated by respective data stored in the above-described main memory to predetermined values (for example, 0 or Null value).

Next, the CPU 10 acquires the operation data (step 42) and proceeds to the next step. For example, the CPU 10 uses the operation data received from the board type controller 9 and data representing detected load values included in the operation data to update the load data Da1. Here, the operation data includes data representing load values detected by the load sensors 94a to 94d. The load data Da1 is updated by using each of the data identified by the identification information of the load sensors 94a to 94d. The CPU 10 uses the operation data received from the board type controller 9 to update the distance data Da2 using data representing detected distance values included in the operation data. Here, the distance data Da2 is updated by using each of the data identified by the identification information of the distance sensors 97L and 97R. The cycle of receiving the operation data is different from the processing cycle executing step 42. Therefore, the operation data are received multiple times during the processing cycle and stored in a buffer. In step 42, the latest piece of operation data among the operation data received multiple times is used to update the operation data Da.

Next, the CPU 10 calculates a load value and a center-of-gravity position (step 43), and proceeds to the next step.

For example, the CPU 10 calculates the total load value by summing up the detected load values represented by the load data Da1, and updates the latest data in the time-sequence data array of the load value data Db by using the data representing the total load value. Specifically, since the load data Da1 represents the latest load values detected by the load sensors 94a to 94d, the total load value is obtained by summing up the detected load values. Further, the CPU 10 calculates a center-of-gravity position by using the detected load values represented by the load data Da1, and updates the latest data in the time-sequence data array of the center-of-gravity position data Dc by using the data representing the center-of-gravity position. Hereinafter, an example of a center-of-gravity position calculation method will be described.

The center-of-gravity position is a position of the center of gravity of a load applied to the platform 9a of the board type controller 9, and is determined based on the load values detected by the load sensors 94a to 94d (see FIG. 6). For example, the center-of-gravity position is represented by coordinate values based on a predetermined coordinate system (e.g., a XY coordinate system in which the center of the platform 9a corresponds to an origin thereof, the long side direction of the platform 9a corresponds to the X axis direction, and the short side direction corresponds to the Y axis direction) corresponding to a position on the platform 9a of the board type controller 9. Assuming that a load value detected by the load sensor 94a is defined as "a", a load value detected by the load sensor 94b is defined as "b", a load value detected by the load sensor 94c is defined as "c", and a load value detected by the load sensor 94d is defined as "d", an X-axis coordinate value (X) and a Y-axis coordinate value (Y) of the center of gravity is calculated based on the following equations:

$$X=((a+c)-(b+d))\times m;$$

$$Y=((c+d)-(a+b))\times n,$$

where m and n are predetermined constants. The center-of-gravity position, which is thus calculated, varies in accordance with an action or a weight shift (posture) of the user on the board type controller 9. For example, when the user raises his/her left foot, the X-axis coordinate value of a center-of-gravity position is positive, and when the user raises his/her right foot, the X-axis coordinate value of a center-of-gravity position is negative. The equations for the center-of-gravity position are merely by way of example, and the center-of-gravity position may be calculated by other methods.

Next, the CPU 10 calculates the left-foot height and the right-foot height (step 44) and proceeds to the next step. For example, the CPU 10 calculates the left-foot height by using the distance value, which is detected by the distance sensor 97L and represented by the distance data Da2, and updates the latest data in the time-sequence data array of the left-foot height data Dd by using the data representing the left-foot height. Also, the CPU 10 calculates the right-foot height by using the distance value, which is detected by the distance sensor 97R and represented by the distance data Da2, and updates the latest data in the time-sequence data array of the right-foot height data De by using the data representing the right-foot height. As one example, the left-foot height HL and the right-foot height HR are calculated by using the following equations.

$$HL=f1(DL);$$

$$HR=f2(DR),$$

where DL is a distance value detected by the distance sensor 97L, and DR is a distance value detected by the distance sensor 97R. Notations f1 and f2 each represent a mathematical expression which is substituted by the corresponding detected distance values and the corresponding detected distance values are converted into the lengths in the real world. The mathematical expressions f1 and f2 may be determined based on output characteristics of the distance sensors 97L and/or 97R, respectively, or may be determined by a distance adjustment operation performed by a user prior to the information processing. If the detected distance values of the distance sensors 97L and 97R acquired by the game apparatus body 5 replicates the lengths in the real world, the following determination may be made: HL=DL and HR=DR.

Next, the CPU 10 performs the action setting process (step 45) and proceeds to the next step. Hereinafter, an example of the action setting process performed in step 45 will be described with reference to FIG. 14.

As shown in FIG. 14, the CPU 10 determines whether the user raises his/her left foot (step 51). If it is determined that the user raises his/her left foot, the CPU 10 proceeds to the next step 52. If it is determined, on the other hand, that the user does not raise his/her left foot, the CPU 10 proceeds to step 58. In a first example, if the latest left-foot height HL represented by the left-foot height data Dd satisfies a predetermined criterion (for example, the latest left-foot height HL is equal to or greater than a first determination value), the CPU 10 determines that the user raises his/her left foot. In the first example, a predetermined criterion (for example, the latest right-foot height HR is substantially 0) may be set for the latest right-foot height HR represented by the right-foot height data De. That is, it is determined that the user raises his/her left foot if both the latest left-foot height HL and the latest right-foot height HR satisfy the respective predetermined criteria. In a second example, if the latest center-of-gravity position represented by the center-of-gravity position data Dc satisfies a predetermined criterion (for example, the X-axis coordinate value of the latest center-of-gravity position is equal to or greater than a second determination value), the CPU 10 determines that the user raises his/her left foot. In a third example, if the determination made in the first example is affirmative, or the determination made in the second example is affirmative, the CPU 10 determines that the user raises his/her left foot. In a fourth example, if both the determination made in the first example and the determination made in the second example are affirmative, the CPU 10 determines that the user raises his/her left foot.

In step 52, the CPU 10 sets the player object Po's action, based on the left-foot height HL, and proceeds to the next step. For example, the CPU 10 updates the object action data Dg by setting the player object Po's actions so that the player object Po runs, walks, or stops in a position, raising its left foot up to the latest left-foot height HL represented by the left-foot height data Dd. Here, the setting of the player object Po as running, walking, or remaining motionless in a position, is made based on the speed represented by the travel speed data Dh. If the latest left-foot height HL represented by the left-foot height data Dd is less than the first determination value or if non-detection of object is indicated, the CPU 10 may set a predetermined value to the height of the left foot raised by the player object Po and thereby update the object action data Dg.

Next, the CPU 10 determines whether the left-foot flag is set to ON (step 53). If the left-foot flag is set to OFF or Null value, the CPU 10 proceeds to the next step 54. On the other hand, if the left-foot flag is set to ON, the CPU 10 ends the process of this sub-routine. In step 53, the CPU 10, for example, refers to the left-foot flag data Df to determine whether the left-foot flag is set to ON.

In step 54, the CPU 10 calculates the travel speed, the travel distance, and the accumulated amount of exercise, and proceeds to the next step. For example, the CPU 10 calculates the travel speed, the travel distance, and the accumulated amount of exercise by using at least one of: the length (time) of process time period; changes of the right-foot height HR in the process time period; changes of the total load value in the process time period:, and the center-of-gravity position in the process time period, as the process time period being from when the left-foot flag is set to OFF to the current moment.

For example, on the basis of the length (time) of process time period and changes of the right-foot height HR in the process time period, the travel speed (the speed at which the player object Po moves) is calculated and the travel speed data Dh is updated by using the calculated speed. Specifically, the longer the length of process time period is, faster the speed, at which the player object Po moves, is calculated by the CPU 10, and the longer the maximum value of the right-foot height HR in the process time period is, faster the speed, at which the player object Po moves, is calculated by the CPU 10. That is, the shorter the intervals between steps performed by the user on the board type controller 9, the faster the speed at which the player object Po moves in the virtual world, and the higher the user raises the feet when stepping on the board type controller 9, the faster the speed at which the player object Po moves in the virtual world. In contrast, when the user steps on the board type controller 9 without raising feet so high but at fast pace, the maximum value of the right-foot height HR in the process time period becomes shorter while the length of process time period becomes shorter. As a result, the speed at which the player object Po moves in the virtual world may not increase.

Further, the travel distance (the distance the player object Po has moved) is calculated based on the length (time) of process time period and the speed at which the player object Po moves which is calculated as described above, and the travel distance data Di is updated by using the calculated distance. Specifically, on the basis of the length of process time period and the speed at which the player object Po moves, the CPU 10 calculates a distance the player object Po has moved in the virtual world during the process time. The CPU 10 then calculates a new travel distance by adding the calculated distance of movement to the travel distance represented by the travel distance data Di, and updates the travel distance data Di by using the new travel distance. The CPU 10 calculates a new location of the player object Po in the virtual world, based on the new travel distance, and updates the object action data Dg by using the new location.

Further, the accumulated amount of exercise is calculated based on changes of the right-foot height HR in the process time period, and the accumulated-amount-of-exercise data Dj is updated by using the calculated accumulated amount of exercise. As one example, the larger the maximum value of the right-foot height HR in the process time period is, the larger the amount of exercise Cr (i.e., the energy consumption during the process time period) during the process time period is calculated by the CPU 10. Specifically, the amount of exercise Cr during the process time period is calculated by the following:

$$Cr = (HR\text{max}) \times p1,$$

where HRmax is a maximum value of the right-foot height HR in the process time period, and p1 is a constant for converting the maximum value of the height of a raised foot into the amount of exercise. The CPU 10 calculates a new accumulated amount of exercise by adding the calculated amount of exercise Cr to the accumulated amount of exercise represented by the accumulated-amount-of-exercise data Dj, and updates the accumulated-amount-of-exercise data Dj by using the new accumulated amount of exercise. In this case, as will be described later, the accumulated amount of exercise is calculated based on a value obtained by the accumulation of the maximum value HRmax of the right-foot height HR and the maximum value HLmax of the left-foot height HL.

While, in the above-described example, the amount of exercise Cr is calculated by using the maximum value of the right-foot height HR in the process time period, the amount of exercise Cr may be calculated by using a maximal value of the right-foot height HR in the process time period. For example, if changes of the right-foot height HR during the process time period indicate one-time up/down action, a maximal value during the process time period is the same as the maximum value described above. However, if changes of the right-foot height HR during the process time period indicate the several number of times of up/down actions, the several number of maximal values are obtained during the process time period. Thus, by calculating the amount of exercise Cr for each of the maximal values, the calculation of the amount of exercise in consideration of such a difference in action during the process time period, is possible. In the following description, a process using the maximum value of the right-foot height HR will be described. The maximal value can also be used in the process in a similar manner.

In another example, the greater an integration value of the right-foot height HR obtained in the process time period is, the larger the amount of exercise Cr during the process time period is calculated by the CPU 10. Specifically, the amount of exercise Cr during the process time period is calculated by the following:

$$Cr=(HRint) \times q1,$$

where HRint is an integration value of the right-foot height HR obtained in the process time period, and q1 is a constant for converting an integration value of the height of a raised foot into the amount of exercise. The CPU 10 calculates a new accumulated amount of exercise by adding the calculated amount of exercise Cr to the accumulated amount of exercise represented by the accumulated-amount-of-exercise data Dj, and updates the accumulated-amount-of-exercise data Dj by using the new accumulated amount of exercise. In this case, as will be described later, the accumulated amount of exercise is calculated based on a value obtained by the accumulation of the integration value HRint of the right-foot height HR and an integration value HLint of the left-foot height HL.

The amount of exercise Cr during the process time period may be calculated in further consideration of the user's weight. For example, one indication for the amount of exercise (kcal) at jogging may also be calculated by weight (kg)×distance (km) and when such estimation is used, the amount of exercise Cr during the process time period may be calculated by the following:

$$Cr=(HRmax) \times W \times p2;$$

or $$Cr=(HRint) \times W \times q2,$$

where W is the user's weight, p2 is a constant for converting, into the amount of exercise, a value obtained by multiplying the maximum value of the height of a raised foot by the user's weight, and q2 is a constant for converting, into the amount of exercise, a value obtained by multiplying the integration value of the height of a raised foot by the user's weight. The weight W may be changes (for example, an average value) of the total load value in the process time period or a value previously inputted by the user.

The amount of exercise Cr during the process time period may be calculated in further consideration of changes of the center-of-gravity position in the process time period. For example, the longer the distance the center-of-gravity position moves, the more energetic the user may exercise on the board type controller 9. Thus, the amount of exercise Cr during the process time period may be calculated by multiplying the maximum value or integration value of the height of a raised foot by the distance of movement of the center-of-gravity position during the process time period. In this case, the amount of exercise Cr during the process time period may be calculated by the following:

$$Cr=(HRmax) \times GL \times p3;$$

or $$Cr=(HRint) \times GL \times q3,$$

where GL is the distance the center-of-gravity position moves during the process time period, p3 is a constant for converting, into the amount of exercise, a value obtained by multiplying the maximum value of the height of a raised foot by the distance the center-of-gravity position moves, and q3 is a constant for converting, into the amount of exercise, a value obtained by multiplying the integration value of the height of a raised foot by the distance the center-of-gravity position moves. It is needless to say that, in addition to the consideration of the user's weight, changes of the center-of-gravity position in the process time period may further be considered upon the calculation of the amount of exercise Cr.

Next, the CPU 10 sets the left-foot flag to ON (step 55) and proceeds to the next step. For example, the CPU 10 sets the left-foot flag to ON, and updates the left-foot flag data Df.

Next, by using changes of the right-foot height HR in a process time period which is from when the left-foot flag is set to OFF to the current moment, the CPU 10 determines whether the maximum value HRmax of the right-foot height HR in the process time period reaches a third determination value (step 56). Here, the third determination value is a threshold value provided for prompting the user for appropriate exercise. For example, if the user raises his/her right foot to a height above the third determination value, it is determined that the user exercises appropriately and a setting is made to the third determination value, in accordance with the type of exercise the user is prompted to perform. If the maximum value HRmax of the right-foot height HR does not reach the third determination value, the CPU 10 proceeds to the next step 57. On the other hand, if the maximum value HRmax of the right-foot height HR reaches the third determination value, the CPU 10 proceeds to the next step 65.

In step 57, the CPU 10 sets a message to inform to the user, and ends the process of this sub-routine. For example, the CPU 10 sets a message prompting the user to exercise raising his/her feet higher, and updates the message data Dk by using data representing the set messages.

In step 65, on the other hand, the CPU 10 deletes the message informed to the user, and ends the process of this sub-routine. For example, if a message, prompting the user to exercise raising his/her feet higher, is set in the message data Dk, the CPU 10 deletes the message, and update the message data Dk.

If it is determined that the user does not raise his/her left foot (negative determination in step 51), the CPU 10 determines whether the user raises his/her right foot (step 58). If it is determined that the user raises his/her right foot, the CPU 10 proceeds to the next step 59. If it is determined, on the other hand, that the user does not raise his/her right foot, the CPU 10 proceeds to the next step 66. In a first example, if the latest right-foot height HR represented by the right-foot height data De satisfies a predetermined criterion (for example, if the latest right-foot height HR is equal to or greater than the first determination value), the CPU 10 determines that the user raises his/her right foot. In the first example, a predetermined criterion (for example, the latest left-foot height HL is substantially 0) may be set for the latest left-foot height HL represented by the left-foot height data Dd. That is, if both the latest right-foot height HR and the latest left-foot height HL satisfy the respective predetermined criteria, it is determined that the user raises his/her right foot. In a second example, if the latest center-of-gravity position represented by the center-of-gravity position data Dc satisfies a predetermined criterion (for example, if the X-axis coordinate value of the latest center-of-gravity position is a negative value equal to or less than the second determination value), the CPU 10 determines that the user raises his/her right foot. In a third example, if the determination made in the first example is affirmative, or the determination made in the second example is affirmative, it is determined that the user raises his/her right foot. In a fourth example, if both the determination made in the first example and the determination made in the second example are affirmative, it is determined that the user raises his/her right foot.

In step 59, the CPU 10 sets an action of the player object Po, based on the right-foot height HR, and proceeds to the next step. The setting of the action of the player object Po in step 59 undergoes the same process with the action setting in step 52 except that the setting in step 59 is made with respect to the right foot while the setting in step 52 is made with respect to the left foot. Thus, the detailed description is omitted.

Next, the CPU 10 determines whether the left-foot flag is set to OFF (step 60). If the left-foot flag is set to ON or Null value, the CPU 10 proceeds to the next step 61. If the left-foot flag is set to OFF, on the other hand, the CPU 10 ends the process of this sub-routine. In step 60, the CPU 10, for example, refers to the left-foot flag data Df to determine whether the left-foot flag is set to OFF.

In step 61, the CPU 10 calculates the travel speed, the travel distance, and the accumulated amount of exercise, and proceeds to the next step. For example, as in step 54, the CPU 10 calculates the travel speed, the travel distance, and the accumulated amount of exercise by using at least one of: the length (time) of process time period; changes of the left-foot height HL in the process time period; changes of the total load value in the process time period; and changes of the center-of-gravity position in the process time period, as the process time period being from when the left-foot flag is set to ON to the current moment.

For example, on the basis of the length (time) of process time period and changes of the left-foot height HL in the process time period, the travel speed (speed at which the player object Po moves) is calculated and the travel speed data Dh is updated by using the calculated speed. Specifically, the shorter the length of process time period is, faster the speed at which the player object Po moves is calculated by the CPU 10, and the longer the maximum value of the left-foot height HL in the process time period is, faster the speed at which the player object Po moves is calculated by the CPU 10.

Also, as in step 54, the travel distance (the distance the player object Po has moved) is calculated based on the length (time) of process time period and the speed at which the player object Po moves which is calculated as described above, and the travel distance data Di is updated by using the calculated travel distance. In addition, the CPU 10 calculates a new location of the player object Po in the virtual world, based on the calculated travel distance, and updates the object action data Dg by using the new location.

The accumulated amount of exercise is calculated based on changes of the left-foot height HL in the process time period, and the accumulated-amount-of-exercise data Dj is updated by using the calculated accumulated amount of exercise. As one example, the larger the maximum value of the left-foot height HL in the process time period is, the larger an amount of exercise C1 (i.e., the energy consumption during the process time period) during the process time period is calculated by the CPU 10. Specifically, the amount of exercise C1 during the process time period is calculated by the following:

$$C1 = (HL\text{max}) \times p1,$$

where HLmax is a maximum value of the left-foot height HL in the process time period, p1 is a constant for converting the maximum value of the height of a raised foot into the amount of exercise. The CPU 10 calculates a new accumulated amount of exercise by adding the calculated amount of exercise C1 to the accumulated amount of exercise represented by the accumulated-amount-of-exercise data Dj, and updates the accumulated-amount-of-exercise data Dj by using the new accumulated amount of exercise. Therefore, in this case, the accumulated amount of exercise is calculated in combination with the process in step 54, based on a value obtained by the accumulation of the maximum value HRmax of the right-foot height HR and the maximum value HLmax of the left-foot height HL.

While, in the above-described example, the amount of exercise C1 is calculated by using the maximum value of the left-foot height HL in the process time period, the amount of exercise C1 may be calculated by using a maximal value of the left-foot height HL in the process time period. For example, if changes of the left-foot height HL during the process time period indicate one-time up/down action, a maximal value during the process time period is the same as the maximum value described above. However, if changes of the left-foot height HL during the process time period indicate the several number of times of up/down actions, the several number of maximal values are obtained during the process time period. Thus, by calculating the amount of exercise C1 for each of the maximal values, the calculation of the amount of exercise in consideration of such a difference in action during the process time period, is possible. In the following description, a process using the maximum value of the left-foot height HL will be described. The maximal value can also be used in the process in a similar manner.

In another example, the greater an integration value of the left-foot height HL obtained in the process time period, the larger the amount of exercise C1 during the process time period is calculated by the CPU 10. Specifically, the amount of exercise C1 during the process time period is calculated by the following:

$$C1=(HL\text{int})\times q1,$$

where HLint is the integration value of the left-foot height HL obtained in the process time period, q1 is a constant for converting an integration value of the height of a raised foot into the amount of exercise. The CPU 10 calculates a new accumulated amount of exercise by adding the calculated amount of exercise C1 to the accumulated amount of exercise represented by the accumulated-amount-of-exercise data Dj, and updates the accumulated-amount-of-exercise data Dj by using the new accumulated amount of exercise. Thus, in this case, the accumulated amount of exercise is calculated in combination with the process in step 54, based on a value obtained by the accumulation of the integration value HRint of the right-foot height HR and the integration value HLint of the left-foot height HL.

As in step 54, the amount of exercise C1 during the process time period may also be calculated in further consideration of the user's weight W. Further, the amount of exercise C1 during the process time period may also be calculated in further consideration of changes of the center-of-gravity position in the process time period. It is needless to say that, in addition to the consideration of the user's weight W, changes of the center-of-gravity position in the process time period may further be considered upon the calculation of the amount of exercise C1.

Next, the CPU 10 sets the left-foot flag to OFF (step 62) and proceeds to the next step. For example, the CPU 10 sets the left-foot flag to OFF, and updates the left-foot flag data Df.

Next, by using changes of the left-foot height HL in the process time period which is from when the left-foot flag is set to ON to the current moment, the CPU 10 determines whether the maximum value HLmax of the left-foot height HL in the process time period reaches a third determination value (step 63). If the maximum value HLmax of the left-foot height HL does not reach the third determination value, the CPU 10 proceeds to the next step 64. On the other hand, if the maximum value HLmax of the left-foot height HL reaches the third determination value, the CPU 10 proceeds to the next step 65.

In step 64, as in step 57, the CPU 10 sets a message to inform to the user, and ends the process of this sub-routine.

If it is determined that the user does not raise his/her left foot (negative determination in step 51) and also that the user does not raise his/her right foot (negative determination in step 58), the CPU 10 performs other process (step 66), and ends the process of this sub-routine. As one example, if the latest left-foot height HL represented by the left-foot height data Dd and the latest right-foot height HR represented by the right-foot height data De are substantially 0, the CPU 10 determines that the user remains motionless, resting his/her both feet on the board type controller 9. If the latest left-foot height HL represented by the left-foot height data Dd and the latest right-foot height HR represented by the right-foot height data De each indicate non-detection of object, the CPU 10 determines that the user has left the board type controller 9. In such cases, the CPU 10 sets the object action data Dg so that the player object Po becomes motionless in the virtual world, sets the travel speed data Dh so that the travel speed is 0, and sets the left-foot flag data Df so that the setting of the left-foot flag is changed to Null value. In another example, if the latest left-foot height HL represented by the left-foot height data Dd and the latest right-foot height HR represented by the right-foot height data De are equal to or greater than the respective threshold values, the CPU 10 determines that the user is jumping on the board type controller 9. In this case, the CPU 10 sets the object action data Dg so that the player object Po jumps in the virtual world, raising its left foot to the height corresponding to the latest left-foot height HL and raising its right foot to the height corresponding to the latest right-foot height HR, sets the travel speed data Dh so that the travel speed is 0, and sets to the left-foot flag data Df so that the setting of the left-foot flag is changed to Null value.

Referring back to FIG. 13, after the action setting process in step 45, the CPU 10 executes a display control process (step 46), and proceeds to the next step. For example, the CPU 10 causes the player object Po to make an action, disposes the player object Po in the virtual world, and displays the player object Po on the monitor 2, based on the action and position of the object represented by the object action data Dg. In addition, the CPU 10 generates exercise information Io (see FIG. 11), based on the travel speed data Dh, the travel distance data Di, and the accumulated-amount-of-exercise data Dj, and displays the exercise information Io on the monitor 2. Furthermore, if a message is set in the message data Dk, the CPU 10 displays information showing the message (for example, character information or icon information) on the monitor 2.

Next, the CPU 10 determines whether to end the game (step 47). The game is to be ended, for example, when conditions for game over or game clear are satisfied, or when the user has performed an operation to end the game. When the game is not to be ended, the CPU 10 returns to step 42 and repeats the processing, whereas when the game is to be ended, the CPU 10 ends the processing of the flowchart.

According to the above-mentioned process, not only the number of steps (step count) the user makes on the board type controller 9, also the heights of feet the user raises are also used. Thus, comprehensive determination of the user's action is possible. For example, although the number of steps is the same, the action determination of the user can be changed in accordance with the low or high heights of the raised feet. Thus, various information processing based on the action determination is possible.

In the example of the process described above, the user performs the step action on the board type controller 9. However, other actions by the user may be determined using the board type controller 9. As one example, an action by the user as running on the board type controller 9 is determined by using the board type controller 9. In this case, both the feet may be raised from the board type controller 9. In such case, in addition to the case where the negative determination is made in step 51, in the action setting process shown in FIG. 14, the process of step 58 is performed subsequently to the process for the case where the left foot is raised (for example, step 52 to step 57, and step 65). Instead of providing the process of step 55 and the process of step 62, a process of setting the left-foot flag to ON when the left foot is raised, and a process of setting the left-foot flag to OFF when the left foot is on the board type controller 9 are added. In addition, a right-foot flag is newly set in which the right-foot flag is set to ON when the right foot is raised and the right-foot flag is set to OFF when the right foot is on the board type controller 9, and a process of setting the right-foot flag as such is added. By changing the process as described above, the process with respect to the period for which the left foot is being raised is performed (for example, the process of the calculation of the travel speed, the travel distance, and the accumulated amount of exercise, based on the height of the left foot during the period, and the process for setting the message) when the left foot is put on the board type controller 9. In addition, the process with respect to the period for which the right foot is being raised is performed (for example, the process of the calculation of the travel speed, the travel distance, and the accumulated amount of exercise, based on the height of the right foot during the period, and the process for setting the message) when the right foot is put on the board type controller 9. Therefore, even when the user performs an action so that both the feet are being raised from the board type controller 9, information processing in the similar manner as for the step action is possible.

The objects to be detected by the distance sensors 97L and 97R may not be the user's feet which are in the perpendicular direction away from the platform 9a, and may be a portion of the user's body (for example, a leg, hand, thigh, head, and the like) or items held or borne by the user. As one example, since by detecting, by the distance sensors 97L and 97R, two different positions on one object in the perpendicular direction away from the platform 9a, distances from the platform 9a to the two positions on the object are detected. Thus, by additionally calculating an angle of the object in the perpendicular direction away from the platform 9a, the above information processing can be calculated using the angle. In this manner, by treating various portions of the user's body and items as detection objects for the distance sensors 97L and 97R, determination of various user actions is possible. It is needless to say that the positions of the distance sensors 97L and 97R in the board type controller 9 may be changed accordingly, depending on the detection objects.

In the example of the process described above, images of the player object Po running or walking in the virtual world are displayed on the monitor 2, in accordance with the user's actions determined using the board type controller 9. It is, however, needless to say that the exemplary embodiment is also applicable to other information processing. For example, images of the player object Po moving in the virtual world, handling a bicycle, monocycle, or the like may be displayed on the monitor 2, in accordance with the user's actions determined using the board type controller 9. Alternatively, such images in accordance with the user's actions determined using the board type controller 9 may not be displayed. For example, exercise information in accordance with the user's actions determined using the board type controller 9 may be informed to the user by sound. Alternatively, the information processing system may be configured in which the exercise information is accumulated in a predetermined storage medium or transmitted to other apparatus.

In the example of the process described above, the two distance sensors 97L and 97R are provided in the board type controller 9. The same process, however, is possible for the case where one distance sensor 97 (for example, the distance sensor 97L) is provided in the board type controller 9. For example, in the case where the user performs the step action on the board type controller 9, it can be assumed that the step action of the left foot and the step action of the right foot are the same action being alternately repeated. Therefore, if changes of the height of one foot detected by one distance sensor 97 are assumed to be the same with changes of the height of the other foot, the same process is possible using one distance sensor 97.

Alternatively, three or more distance sensors 97, which detect distances from the platform 9a to an object away therefrom in the perpendicular direction can be provided in the board type controller 9. For example, if a plurality of distance sensors 97 is provided in positions corresponding to one leg, not only the height of a foot of the user performing the step action on the board type controller 9, also an angle of the raised leg (a posture of the leg) and the like can be used for the action determination of the user. In addition, since distances to the plurality of positions on one leg are detectable, accurate distances in consideration of the maximum values and minimum values of these distances, can be used for the information processing. It is needless to say that, in the case where three or more distance sensors 97 are provided in the board type controller 9, not only the feet the user raises, other portions of the user's body, and items the user is carrying with can also be treated as distance detection objects.

In the above description, the board type controller 9 is provided with a plurality of load sensors 94. However, if information of the center-of-gravity position of a load applied to the board type controller 9 is not required in the above-mentioned process, the board type controller 9 may be provided with at least one load sensor 94. In the above process, if neither the information of the load applied to the board type controller 9 nor information of the center-of-gravity position is required in the above-mentioned process, the board type controller 9 may be provided with no load sensor 94. In either case, the user operation which is stepping on the board type controller 9 can be determined only by the detected distance values obtained from the distance sensors 97L and 97R. Thus, even if there is one load sensor 94 provided or if the detected load values are unobtainable, the same determination of the user action is possible.

Also, it is presumable that the user bears weights on the legs and the like and exercises on the board type controller 9. For example, it is presumable that the user exercises on the board type controller 9, bearing weights, the weight of which is adjustable by adding water, sands or the like in a container such as a plastic bottle, in addition to common weights made of a metal such as lead. In this case, for example, by previously inputting to the game apparatus body 5, using the controller 7, the weight of the weighs borne by the user, information processing in consideration of the weight is possible. For example, upon the calculation of the accumulated amount of exercise, using changes of the height H of a foot in the process time period, the previously input weight may be considered. Specifically, the calculation of the amount of exercise (i.e., the energy consumption during the process time period) in consideration of the previously input weight is possible by calculating an amount of exercise C during the process time period by the following:

$$C = (H\max) \times Wp \times p3;$$

or $$C = (H\mathrm{int}) \times Wp \times q3,$$

where Hmax is the maximum value of the height H of the left or right foot in the process time period, Hint is an integration value of the height H of the left or right foot obtained in the process time period, Wp is a previously inputted weight of weights, p3 is a constant for converting, into the amount of exercise, a value obtained by multiplying the maximum value of the height of a raised foot by the weight of the weights, and q3 is a constant for converting, into the amount of exercise, a value obtained by multiplying the integration value of the height of the raised foot by the weight of the weights.

For the calculations of the amounts of exercises Cl and Cr during the process time period in consideration of the weight W, as changes (for example, an average value) of the total load value in the process time period being the weight W of the user, the weight of the weights borne by the user may not previously be inputted to the game apparatus body 5. In this case, the total load value in the process time period also includes the weight of the weights borne by the user. Thus, the weight of the weights is already considered in the weight W acquired from the total load value.

Figure 15:
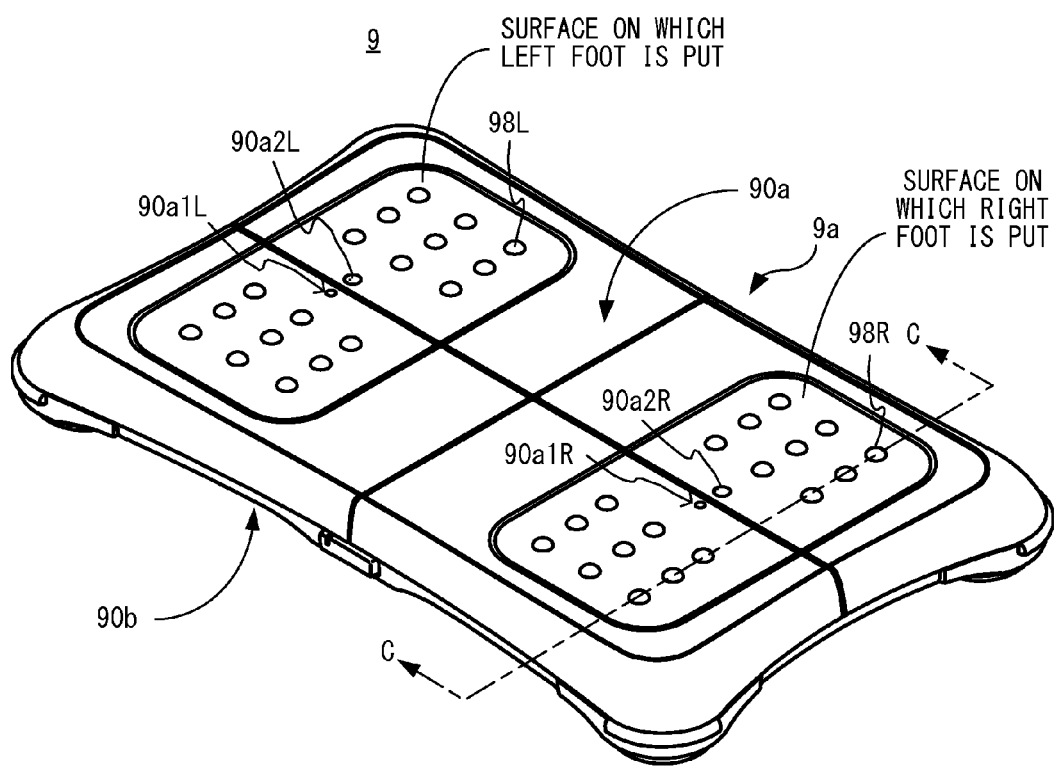
FIG. 15 is a perspective view showing an example of a non-limiting external view of the board type controller 9 provided with projections 98L and 98R.
Figure 16A:
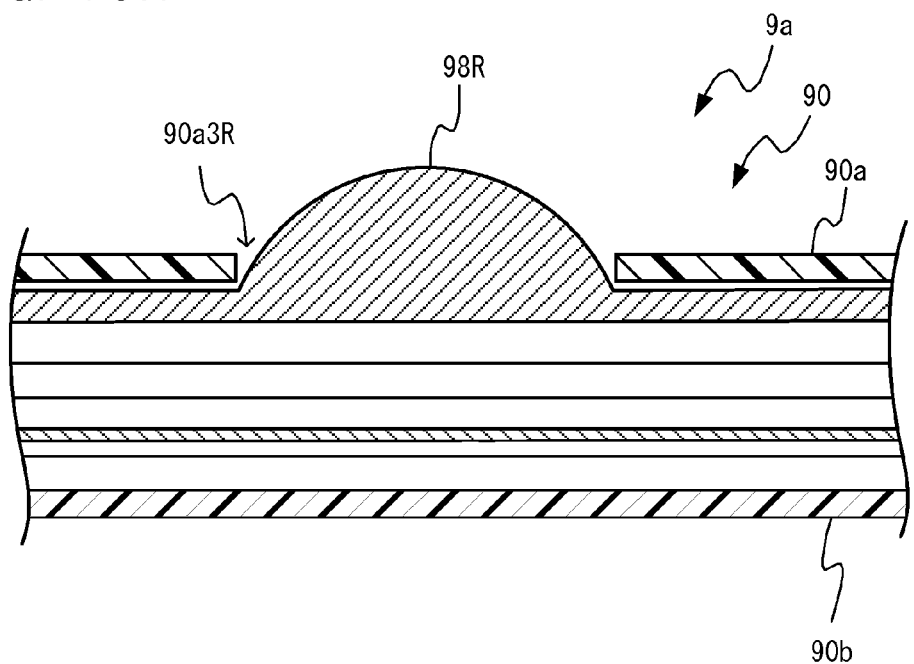
FIG. 16A shows an example of a cross-sectional view of the non-limiting board type controller 9 shown in FIG. 15, taken along a line C-C, and an enlarged view showing an example of a region in which the non-limiting projection 98R is provided being projected from the upper surface.
Figure 16B:
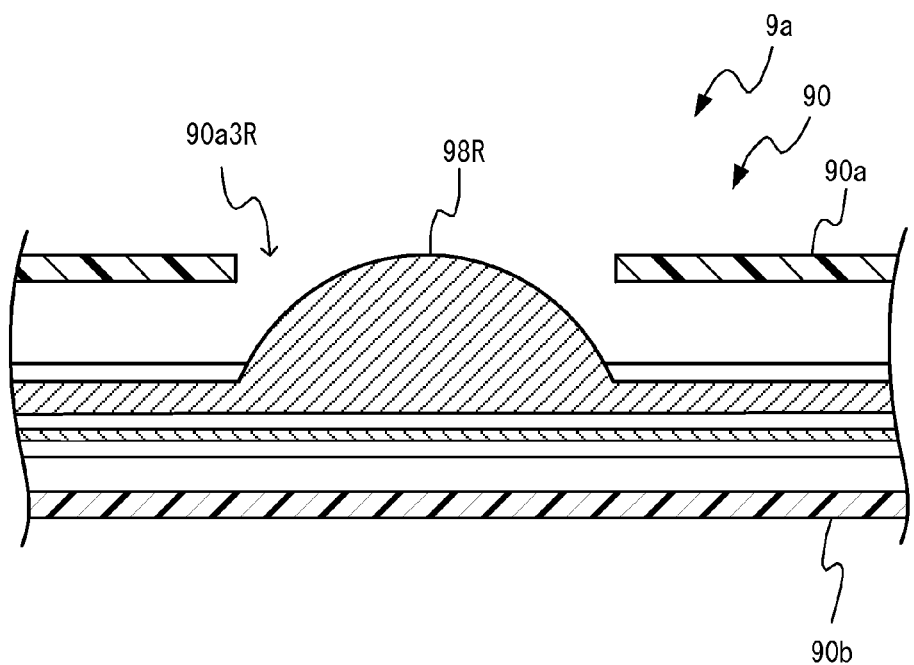
FIG. 16B shows an example of a cross-sectional view of the non-limiting board type controller 9 shown in FIG. 15, taken along a line C-C, and an enlarged view showing an example of a region in which the non-limiting projection 98R is provided being retracted from the upper surface.

Alternatively, protrusions for applying manual pressure to the user's soles may be provided on the platform 9a of the board type controller 9. Hereinafter, one example of projections provided on the board type controller 9 will be described with reference to FIG. 15, FIG. 16A, and FIG. 16B. FIG. 15 is a perspective view showing an example of an external view of the board type controller 9 on which projections 98L and 98R are provided. FIG. 16A is a cross-sectional view showing an example of the board type controller 9 shown in FIG. 15, taken along a line C-C, and is an enlarged view showing an example of a region in which the projection 98R is provided, being projected from the upper surface. FIG. 16B is a cross-sectional view showing an example of the board type controller 9 shown in FIG. 15, taken along a line C-C, and is an enlarged view showing an example of a region in which the projection 98R is provided, being retracted from the upper surface.

As shown in FIG. 15, a plurality of the projections 98L and 98R are provided on the upper surface on the platform 9a. For example, the plurality of projections 98L are provided on a surface of the platform 9a on which the left foot is to be put so as to project upward from the surface. Also, the plurality of projections 98R are provided on the surface of the platform 9a on which the right foot is to be put so as to project upward from the surface. Thus, when the user performs the step action on the board type controller 9, the left sole is put on tops of the projections 98L and the right the right sole is put on tops of the projections 98R. Therefore, an effect of application of manual pressure to both the feet soles is added by the action.

The plurality of projections 98L and 98R may be configured to be accommodated within the board type controller 9. As one example, the plurality of projections 98L and 98R are formed on an upper surface of one plate-shaped member. Due to this, all of the plurality of projections 98L and 98R, formed on the upper surface of the plate-shaped member, move up and down, accompanied by the plate-shaped member being moved up and down. Also, as shown in FIG. 16A and FIG. 16B, a plurality of holes are formed in the upper plate 90a so that the plurality of projections 98L and 98R are inserted therethrough so as to project from the upper surface of the platform 9a (a hole 90a3R having the projection 98R inserted therethrough is represented graphically in FIG. 16A and FIG. 16B.). Then, the plate-shaped member is pushed up from a bottom surface side of the upper plate 90a in a state where the plurality of projections 98L and 98R are inserted through the holes, and the plate-shaped member is then secured by a lock mechanism (not shown), thereby the plurality of projections 98L and 98R are secured in a state projecting out from the upper surface of the platform 9a through the holes (a state shown in FIG. 16A). The lock mechanism is unlocked to release the state in which the plurality of projections 98L and 98R are secured, projecting from the upper surface of the platform 9a, and the plate-shaped member is lowered so as to be away from the bottom surface of the upper plate 90a, thereby the plurality of projections 98L and 98R are retracted from the upper surface of the platform 9a through the holes (the state shown in FIG. 16B). In this manner, the plurality of projections 98L and 98R are configured to be accommodated within the board type controller 9, and thereby the presence and absence of the plurality of projections 98L and 98R can be changed accordingly, depending on the user's preference using the board type controller 9.

Alternatively, the plurality of projections 98L and 98R may be configured to be detachable to the board type controller 9. For example, the plurality of projections 98L and 98R is formed on an upper surface of one plate-shaped member. The plate-shaped member is configured so as to be mounted on the platform 9a such that a bottom surface of the plate-shaped member abuts on the upper surface of the platform 9a, and openings are formed in the plate-shaped member at portions overlapping with the transmissive regions 90a1L, 90a2L, 90a1R, and 90a2R when the plate-shaped member abuts on the upper surface of the platform 9a. In this manner, the above-described user's action is possible in the state where the plate-shaped member having the plurality of projections 98L and 98R provided therein is mounted on the board type controller 9.

Figure 17:
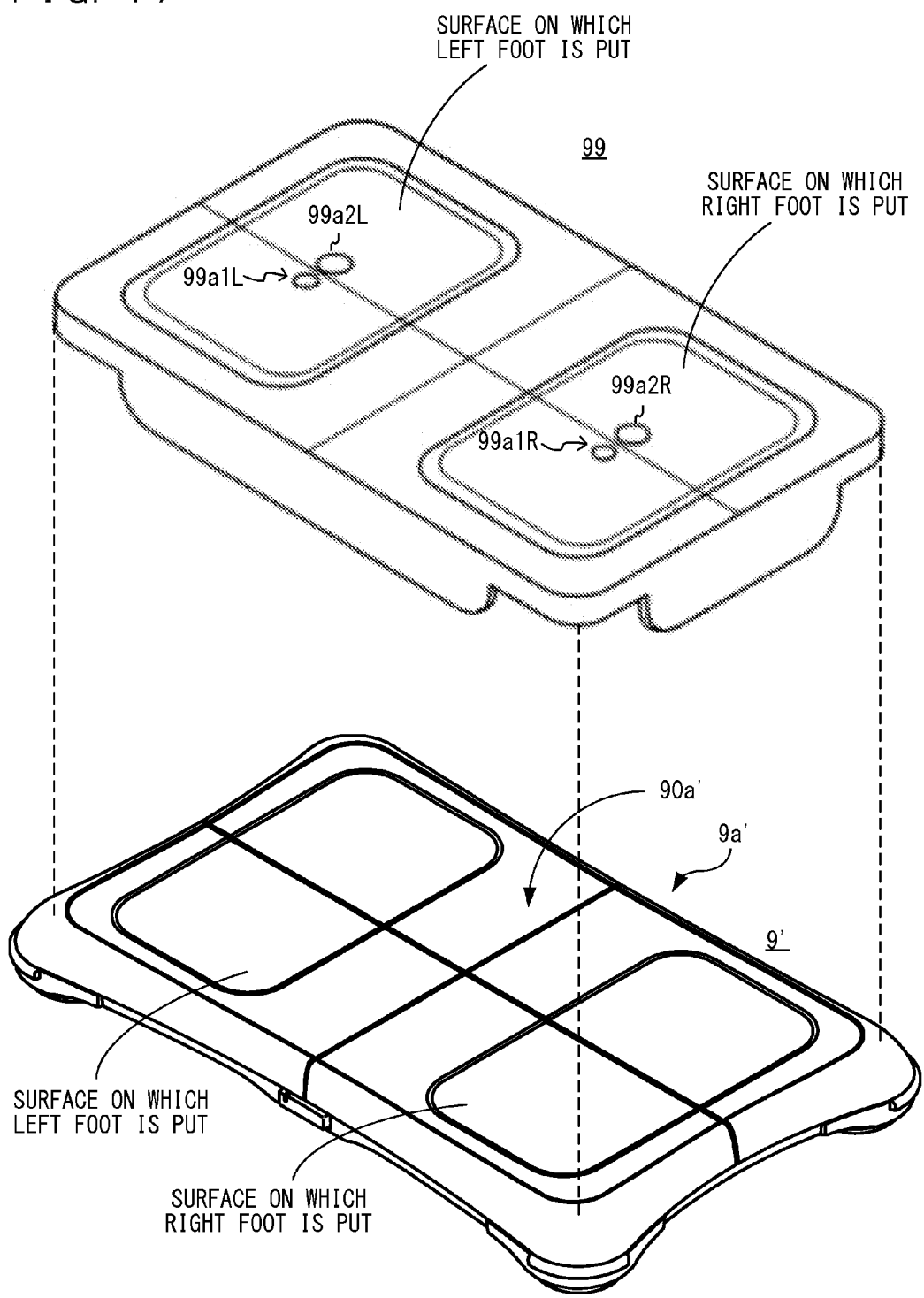
FIG. 17 is a perspective view showing an example of a non-limiting external view of a hollow plate 99 in which the distance sensors 97L and 97R are configured to be detachable, and a board type controller 9'.

Alternatively, the distance sensors 97L and 97R may be configured to be detachable to the board type controller 9. Hereinafter, one example in which the distance sensors 97L and 97R are configured to be detachable to the board type controller 9' will be described with reference to FIG. 17. FIG. 17 is a perspective view showing an example of an external view of a hollow plate 99 in which the distance sensors 97L and 97R are configured to be detachable, and the board type controller 9'.

As shown in FIG. 17, the distance sensors 97L and 97R (not shown) are built inside the hollow plate 99 which is a separate piece from the board type controller 9', and are not provided within the board type controller 9'. The board type controller 9' shown in FIG. 17 does not have the distance sensors 97L and 97R built therein, and has the same structure as the board type controller 9 described above with reference to FIG. 6 and the like, except that the transmissive regions 90a1L, 90a2L, 90a1R, and 90a2R are not formed in the board type controller 9'. Components of the board type controller 9' which are the same as those of the board type controller 9 are distinguished in the following description mutatis mutandis with "'" (derivative) added thereto.

The hollow plate 99 is formed by, for example, plastic molding, and includes a housing formed in a hollow-plate shape which has an upper main surface formed thereon. The upper main surface is similar including its size to the property of the upper surface formed in a substantially square shape which is included in the platform 9a' of the board type controller 9'. For example, as with the platform 9a', the short sides of the rectangular shape of the hollow plate 99 are approximately 30 cm, and the long side thereof is approximately 50 cm. The upper surface of the hollow plate 99 is flat, and has a surface on which the user puts his/her left foot (a far-left region enclosed with a double line FIG. 17) and a surface on which the user puts his/her right foot (a front-right region enclosed with a double line in FIG. 17). Four abutment guide pieces are formed in the bottom portions of the hollow plate 99 so as to be drooped from edges of the lower surface of the hollow plate 99 downwardly, and abut on four side surfaces of the board type controller 9' when mounted on the platform 9a' of the board type controller 9'.

The distance sensor 97L is secured inside a hollow space which is below the center of the surface of the hollow plate 99 on which the left foot is to be put. In the center of the surface on which the left foot is to be put, a transmissive region 99a1L and a transmissive region 99a2L are formed. The transmissive region 99a1L allows light such as infrared light, outputted from the distance sensor 97L, to transmit therethrough so as to be radiated toward the space above the surface, and the transmissive region 99a2L allows light reflected from an object in the upper space, among the radiated light, to transmit therethrough so as to be incident on the distance sensor 97L. The distance sensor 97R is secured inside a hollow space below the center of the surface of the hollow plate 99 on which the right foot is put. In the center of the surface on which the right foot is to be put, a transmissive region 99a1R and a transmissive region 99a2R are formed. The transmissive region 99a1R allows light such as infrared light, outputted from the distance sensor 97R, to transmit therethrough to be radiated toward the space above the surface, and the transmissive region 99a2R allows light reflected from an object in the upper space, among the radiated light, to transmit therethrough to be incident on the distance sensor 97R. As with the transmissive regions 90a1L, 90a2L, 90a1R, and 90a2R, the transmissive regions 99a1L and 99a2L and the transmissive regions 99a1R and 99a2R may be any regions through which waves (for example, infrared light) outputted from the distance sensors 97L and 97R are allowed to transmit, respectively, and may be formed by, for example, any members or holes through which the waves are allowed to transmit.

When the hollow plate 99 is mounted on the platform 9a' of the board type controller 9' so that the lower surface of the hollow plate 99 abut on the upper surface of the platform 9a' and the surface of the hollow plate 99 on which the left foot is to be put is disposed on the surface of the platform 9a' on which the left foot is to be put, the lower surface of the hollow plate 99 abuts on the upper surface of the platform 9a' and four abutment guide pieces abut on the four side surfaces of the board type controller 9', respectively. Thus, when mounted on the platform 9a' of the board type controller 9', the hollow plate 99 is fixed to be secured on the platform 9a' of the board type controller 9'. The hollow plate 99 mounted on the platform 9a' of the board type controller 9' is disposed with the upper main surface, in which the transmissive region 99a1L, 99a2L, 99a1R, and 99a2R are formed, face up.

When the user stands on the hollow plate 99 mounted on the board type controller 9' in this manner, the left foot is put near the center of the surface of the upper main surface of the hollow plate 99 on which the left foot is to be put, and the right foot is put near the center of the surface of the upper main surface of the hollow plate 99 on which the right foot is to be put. Thus, the transmissive regions 99a1L and 99a2L are provided in positions directly below the user's left foot, and the transmissive region 99a1R and 99a2R are provided in positions directly below the user's right foot. When the user on the hollow plate 99 raises his/her left foot, the position of the left foot (the distance from the hollow plate 99 to the left foot, to be accurate, a distance from the distance sensor 97L to the left foot in the direction perpendicular to the upper main surface of the hollow plate 99) is detected by the distance sensor 97L. When the user on the hollow plate 99 raises his/her right foot, the position of the right foot (the distance from the hollow plate 99 to the right foot, to be accurate, a distance from the distance sensor 97R to the right foot in the direction perpendicular to the upper main surface of the hollow plate 99) is detected by the distance sensor 97R.

When the user stands on the hollow plate 99 mounted on the board type controller 9', its load is transferred to four legs 92' through the hollow plate 99, a support plate 90', and load sensors 94a' to 94d'. Therefore, a reaction from a floor, which is generated by the input load, is transferred from the legs 92' through spherical parts 92a', the load sensors 94a' to 94d', an intermediate plate 90c', and an upper plate 90a' to the hollow plate 99. Therefore, the load sensors 94a' to 94d' of the board type controller 9' outputs, from output terminals thereof, voltage signals indicating the load inputted on the hollow plate 99 in the similar manner as the load sensors 94a to 94d of the board type controller 9.

Figure 18:
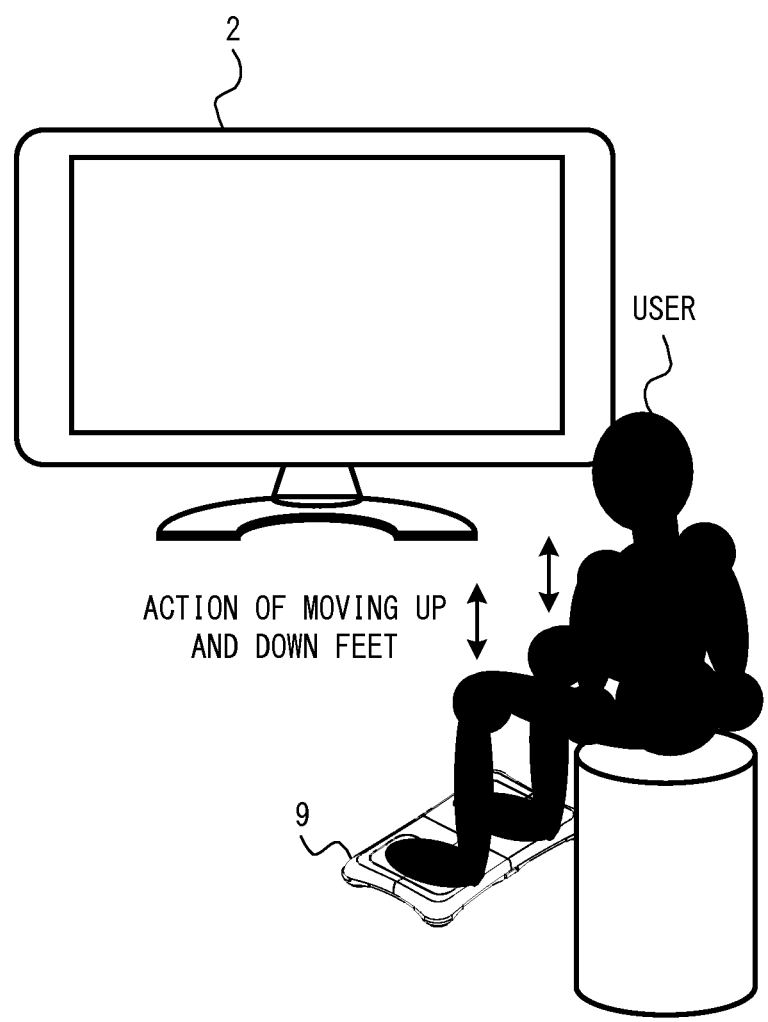
FIG. 18 is a diagram showing another example of the non-limiting state of the user playing the game using the board type controller 9 shown in FIG. 1.

While, the user stands on the board type controller 9 and performs the step action in the exemplary embodiment described above, the board type controller 9 may be operated by the user performing an action in other posture on the board type controller 9. For example, as shown in FIG. 18, an action performed by the user such as moving his/her feet up and down while sitting in a chair may be detected using the board type controller 9. In this case, the user disposes the board type controller 9 below the feet in a posture sitting in a chair and looking at the monitor 2, puts the right foot on the surface of the platform 9a on which the right foot is to be put, and the left foot on the surface of the platform 9a on which the left foot is to be put. The user then performs an action of moving up and down the feet on the board type controller 9 while sitting in the chair. The board type controller 9 can detect the distance therefrom to each raised foot for even such a user action, and also detect the weight of each foot (load). Therefore, as similar to the example in which the user performs the step action on the board type controller 9, information processing in accordance with the user's action is possible.

Here, when the action performed by the user such as moving his/her feet up and down while sitting in a chair is detected using the board type controller 9, the load detected by the board type controller 9 is not the user's weight, but the weight of the user's feet. In this case, the amount of exercise C during the process time period may be calculated in consideration of the weight of the user's feet. For example, the amount of exercise C during the process time period where the action performed by the user such as moving his/her feet up and down while sitting in a chair may be calculated by the following:

$$C = (H\max) \times W1 \times p4;$$

or $$C = (H\text{int}) \times W1 \times q4,$$

where Hmax is the maximum value of the height H of the left or right foot in the process time period, Hint is the integration value of the height H of the left or right foot obtained in the process time period, W1 is the weight of the user's foot, p4 is a constant for converting, into the amount of exercise, a value obtained by multiplying the maximum value of the height of a raised foot by the weight of the user's foot, and q4 is a constant for converting, into the amount of exercise, a value obtained by multiplying the integration value of the height of a raised foot by the weight of a user's foot. The weight W1 of a foot may be changes (for example, an average value) of the total load value in the process time period for which one foot is being raised, or may be a value previously inputted by the user.

It is also presumable that the user performs the action of moving up and down the feet on the board type controller 9 while sitting in the chair, bearing weights around the feet. In this case, for example, by previously inputting the weight of the weighs borne by the user to the game apparatus body 5 by using the controller 7, the information processing in consideration of the weight is possible. For example, the calculation of an amount of exercise (i.e., the energy consumption during the process time period) in consideration of the previously inputted weight is possible by calculating the amount of exercise C during the process time period where the action is performed by the user such as moving his/her feet up and down while sitting in a chair, by the following:

$$C = (H\max) \times (W1 + Wp) \times p5;$$

or $$C = (H\text{int}) \times (W1 + Wp) \times q5.$$

where Wp is previously inputted weight of weights, p5 is a constant for converting, into the amount of exercise, a value obtained by multiplying the maximum value of the height of a raised foot by the weight of a foot and the weights, and q5 is a constant for converting, into the amount of exercise, a value obtained by multiplying the integration value of the height of the raised foot by the weight of a foot and the weights.

Upon the calculation of the amount of exercise C during the process time period in consideration of the weight W1 of one foot as the weight W1 of the user's one foot being changes (for example, an average value) of the total load value in the process time period for which one foot is raised, the weight of the weights borne by the user around his/her feet may not previously be inputted to the game apparatus body 5. In this case, the total load value in the process time period also includes the weight of the weights borne by the user around his/her feet. Thus, the weight of the weights is already considered in the weight W1 of one foot acquired from the total load value.

Alternatively, when the action performed by the user such as moving his/her feet up and down while sitting in a chair or an action of a portions of the user's body other than his/her feet is detected using the board type controller 9, the user may not be on the board type controller 9. Therefore, the board type controller 9 can be configured with a small-sized device. For example, when the action performed by the user such as moving his/her feet up and down while sitting in a chair is detected, the height H of only one foot may be detected. Thus, the board type controller 9 can be configured to have a sufficient size to allow the user's one foot to be put thereon.

In the above description, the controller 7 and the game apparatus body 5 are connected by wireless communication and the board type controller 9 and the game apparatus body 5 are connected by wireless communication. However, the wireless communication may be performed in a manner other than mentioned above. In a first example, the operation data of the board type controller 9 is wirelessly transmitted to the controller 7, and the controller 7 wirelessly transmits to the game apparatus body 5 the operation data of the controller 7 together with the operation data received from the board type controller 9. In this case, the controller 7 and the game apparatus body 5 are directly connected by wireless communication and the board type controller 9 and the game apparatus body 5 are connected by wireless communication via the controller 7. In a second example, the operation data of the controller 7 is wirelessly transmitted to the board type controller 9, the board type controller 9 wirelessly transmits to the game apparatus body 5 the operation data of the board type controller 9 together with the operation data received from the controller 7. In this case, the board type controller 9 and the game apparatus body 5 are directly connected by wireless communication, and the controller 7 and the game apparatus body 5 are connected by wireless communication via the board type controller 9. In a third example, the controller 7 and the board type controller 9 are electrically connected via cables, and the operation data of the board type controller 9 is transmitted to the controller 7 via the cables. The controller 7 then wirelessly transmits to the game apparatus body 5 the operation data of the controller 7 together with the operation data received from the board type controller 9 via the cables. In a fourth example, the controller 7 and the board type controller 9 are electrically connected via cables, and the operation data of the controller 7 is transmitted to the board type controller 9 via the cables. The board type controller 9 then wirelessly transmits to the game apparatus body 5 the operation data of the board type controller 9 together with the operation data received from the controller 7 via the cables.

Alternatively, the controller 7 and/or the board type controller 9 may be electrically connected to the game apparatus body 5 via cables. In this case, the cables connected to the controller 7 and/or the board type controller 9 are connected to connection terminals of the game apparatus body 5. In a first example, the controller 7 and the game apparatus body 5 are electrically connected via a first cable, and the board type controller 9 and the game apparatus body 5 are electrically connected via a second cable. In a second example, only between the controller 7 and the game apparatus body 5 is electrically connected via cables. In this case, the operation data of the board type controller 9 may be wirelessly transmitted to the controller 7, and then transmitted to the game apparatus body 5 via the cables. Alternatively, the operation data of the board type controller 9 may be wirelessly transmitted from the board type controller 9 directly to the game apparatus body 5. In a third example, only between the board type controller 9 and the game apparatus body 5 is electrically connected via a cable. In this case, the operation data of the controller 7 may be wirelessly transmitted to the board type controller 9, and then transmitted to the game apparatus body 5 via the cables. Alternatively, the operation data of the controller 7 may be wirelessly transmitted from the controller 7 directly to the game apparatus body 5.

In the above description, the distance sensor 97L and the distance sensor 97R radiate light, such as infrared light, and employ, so-called, the triangulation in which respective distances therefrom to a detection object are obtained based on information (positions) of reflected waves from the detection object. However, the distance sensor 97L and the distance sensor 97R may be any devices which obtain distances therefrom to the detection object by other distance detection method. For example, the distance sensor 97L and the distance sensor 97R may be devices which obtain distances therefrom to the detection object by using an optical distance detection method such as the time-of-flight or Doppler interferometry. Alternatively, the distance sensor 97L and the distance sensor 97R may be devices which obtain distances therefrom to the detection object by using a distance detection method using a stereo image, in which the distances to a subject are measured by analyzing images obtained from a stereo camera, or by using another distance detection method in which one camera in the above method is replaced by a spot source, a slit source, a pattern source, or the like, and an image obtained from the other camera is analyzed to measure the distance to a subject. Furthermore, the distance sensor 97L and the distance sensor 97R may be devices which employ a distance detection method in which the distance sensor 97L and the distance sensor 97R radiate ultra sound waves and distances therefrom to a detection object are measured based on information regarding the detection object which is obtained by the measurement of the intensity, propagation time, and the like of the reflected waves or a transmitted wave from the detection object. Furthermore, the distance sensor 97L and the distance sensor 97R may be devices which employ a distance detection method in which the distance sensor 97L and the distance sensor 97R radiate lasers (for example, IR laser) to the detection object and distances therefrom to a detection object are measured using the time it took the radiated lasers to be reflected and come back.

The exemplary embodiment has been described by using the stationary game apparatus 3. However, the information processing program of the exemplary embodiment may be executed in an information processing apparatus such as a hand-held game apparatus or a general personal computer, to achieve the exemplary embodiment. Further, the exemplary embodiment may be applied to, as well as the game apparatus, any hand-held electronic devices (e.g., a PDA (Personal Digital Assistant) or a mobile telephone), a personal computer, a camera, and the like. The exemplary embodiment can be achieved by connecting any device to the board type controller 9 wirelessly or via cables.

In the above description, the information processing is executed by the game apparatus body 5. However, at least a part of the process steps in the information processing may be performed by another apparatus. For example, when the game apparatus body 5 is configured to be communicable with another apparatus (e.g., a server or another game apparatus), the process steps in the information processing may be performed by the game apparatus body 5 in combination with the other apparatus. As one example, the other apparatus performs a process of setting the player object Po, a virtual world and the like, and data of an action of the object, the travel speed data, the travel distance data, the accumulated amount of exercise data, and the like is transmitted from the game apparatus body 5 to the other apparatus, and thereby the information processing is performed. Then, image data representing a virtual world generated in the other apparatus is transmitted to the game apparatus body 5, and the virtual world is displayed on the monitor 2. Thus, when at least a part of the process steps in the information processing is performed by another apparatus, the same processing as the information processing is achieved. At least a part of the process steps in the information processing may be performed by the board type controller 9 (microcomputer 100). Further, the above-mentioned information processing can be executed by one processor or by a cooperation of a plurality of processors which is/are included in an information processing system constituted by at least one information processing apparatus. Further, in the exemplary embodiment, the processes shown in the above-mentioned flowcharts are performed by the CPU 10 of the game apparatus body 5 executing the predetermined program. However, a part or the entirety of the processes may be performed by a dedicated circuit included in the game apparatus body 5.

Further, the shape of the game apparatus body 5, the shapes of the controller 7 and the board type controller 9, and the shapes, mounting positions, and the number of operation buttons and sensors, are merely examples. It should be understood that the exemplary embodiment can be achieved by adopting other shapes, mounting positions and other numbers of components. Further, the processing sequences, set values, display modes, and values used in determination which are used in the above-mentioned game process are merely examples. It is understood that the exemplary embodiment can be achieved by adopting other sequences, display modes, and values.

Further, the information processing program (game program) may be supplied to the game apparatus body 5 via a wired or wireless communication circuit, as well as to the game apparatus body 5 via an external storage medium such as the optical disc 4. Further, the information processing program may be previously stored in a nonvolatile storage device inside the game apparatus body 5. Examples of an information storage medium storing the information processing program therein include: a CD-ROM, a DVD, any other optical disc-shaped storage medium similar to these media, a flexible disk, a hard disk, a magnetic optical disk, and a magnetic tape. Further, the information storage medium storing the information processing program therein may be a nonvolatile semiconductor memory or a volatile memory. Such a storage medium is a storage medium readable by a computer or the like. For example, it is possible to provide the above-mentioned various functions by causing a computer or the like to read and execute the programs stored in these storage media.

While a number of exemplary systems, exemplary methods, exemplary devices, and the exemplary apparatus has been described in detail, the foregoing description is in all aspects illustrative and not restrictive. It is understood that numerous other modifications and variations can be devised without departing from the spirit and scope of the appended claims. It should be understood that the scope of the exemplary embodiment is interpreted only by the scope of the appended claims. It is also understood that, from the description of specific embodiments, the one skilled in the art can easily implement the exemplary embodiment in the equivalent range based on the description of the exemplary embodiment and on the common technological knowledge. The elements as used herein, described in a singular form having added thereto the indefinite article such as "a" or "an" should be understood to mean not excluding a plurality. Further, it should be understood that terms as used herein have meanings generally used in the art concerned unless otherwise specified. Therefore, unless otherwise defined, all the jargon and technical terms have the same meanings as those generally understood by one skilled in the art of the exemplary embodiment. In the event of any confliction, the present specification (including definitions) will control.

An information processing system according to the exemplary embodiment, a storage medium having stored therein an information processing program, an information processing apparatus, an input device, and an information processing method allow comprehensive determination of the user's action, and are useful as an information processing system for performing processes based on the user's action, and the like, an information processing program, an information processing apparatus, an input device, and an information processing method.

What is claimed is:

1. An information processing system comprising a first input device on which at least a portion of a user's body is allowed to be positioned and an information processing apparatus for processing data obtained from the first input device, wherein the first input device comprises:
    a first platform on which at least a portion of a user's body is positioned;

a surface, having an area on which a user positions his/her foot sole, is set on a platform surface of the first platform; and at least one distance data output device, disposed below the surface adjacent to the area on which the user positions his/her foot sole, the at least one distance data output device configured to output distance data allowing for acquisition of a distance between the surface and a height of an appendage of the user from the surface of the first platform during an action of the user raising his/her appendage from the first platform, and the information processing apparatus comprises:

a data acquisition device configured to acquire the distance data outputted by the distance data output device; and a processing device configured to calculate at least an amount of exercise of the user based on the distance data acquired by the data acquisition device and perform a predetermined process based on the calculated amount of exercise.

2. The information processing system according to claim 1, wherein a pair of surfaces, on which the user positions his/her feet soles, respectively, is provided on the platform surface of the first platform, and the at least one distance data output device is disposed below at least one of the pair of surfaces, and outputs distance data allowing for acquisition of the distance between the surface and the height of the user's appendage from the surface of the first platform.

3. The information processing system according to claim 2, wherein the distance data output device is disposed below each of the pair of surfaces.

4. The information processing system according to claim 1, wherein two of the distance data output devices are disposed below the surface at a predetermined distance therebetween in a direction along with the surface.

5. The information processing system according to claim 1, wherein the first platform comprises a plurality of projections projected from the surface.

6. The information processing system according to claim 5, wherein the plurality of projections are configured in an up/down movable manner so as to be in a state in which either the plurality of projections project from the surface or the plurality of projections retract from the surface.

7. The information processing system according to claim 1, wherein the processing device comprises a parameter calculation device for calculating a parameter corresponding to an energy consumed by the user, based on a distance in accordance with the distance data, and the processing device performs a predetermined process, based on the parameter calculated by the parameter calculation device.

8. The information processing system according to claim 7, wherein the parameter calculation device calculates the parameter so that the longer the distance in accordance with the distance data is, the larger the energy becomes.

9. The information processing system according to claim 7, wherein the distance data output device repeatedly outputs the distance data determined in accordance with the distance to the object positioned in the direction away from the surface of the first platform, the data acquisition device repeatedly acquires the distance data repeatedly outputted by the distance data output device, and the parameter calculation device calculates the parameter each time the data acquisition device repeatedly acquires the distance data.

10. The information processing system according to claim 7, wherein the parameter calculation device calculates the parameter, based on a maximum value of the distance during a period in which the distance in accordance with the distance data is indicating a predetermined value or above.

11. The information processing system according to claim 7, wherein the parameter calculation device calculates the parameter, based on an integration value of the distance in accordance with the distance data.

12. The information processing system according to claim 7, wherein the parameter calculation device calculates the parameter, based on a maximal value of the distance in accordance with the distance data.

13. The information processing system according to claim 7, wherein a plurality of the distance data output devices are disposed below the surface, and each outputs distance data allowing for acquisition of the distance between the surface and the height of the user's appendage from the surface of the first platform, and the parameter calculation device calculates the parameter, based on a distance in accordance with the distance data outputted by each of the plurality of distance data output devices, and, by summing the parameters, calculates a parameter corresponding to an accumulated energy consumed by the user.

14. The information processing system according to claim 7, wherein the processing device comprises a count calculation device configured to calculate the number of times the user has moved his/her feet up and down on the surface, based on the data outputted by the first input device, and the parameter calculation device calculates the parameter, based on the number of times the user has moved his/her feet up and down, calculated by the count calculation device, and the distance in accordance with the distance data.

15. The information processing system according to claim 14, wherein the parameter calculation device calculates the parameter so that the greater the number of times the user has moved his/her feet up and down, calculated by the count calculation device, is, the larger the energy becomes.

16. The information processing system according to claim 7, wherein the first input device further comprises at least one load data output device configured to output load data determined in accordance with a load applied to the first platform, the data acquisition device acquires the distance data outputted by the distance data output device and the load data outputted by the load data output device, and the parameter calculation device calculates the parameter, based on the distance in accordance with the distance data and a load in accordance with the load data.

17. The information processing system according to claim 7, wherein the information processing apparatus further comprises a weight acquisition device configured to acquire weight of weights borne by the user on the first input device, in accordance with user input, and the parameter calculation device calculates the parameter, based on the distance in accordance with the distance data and the weight acquired by the weight acquisition device.

18. The information processing system according to claim 1, wherein
the distance data output device comprises:
a radiation device configured to radiate a predetermined wave in the direction away from the surface of the first platform;
a reception device configured to receive a reflected wave which is the predetermined wave reflected from the object; and
a detection device configured to detect the distance to the object positioned in the direction away from the surface of the first platform, using information regarding the reflected wave received by the reception device.

19. The information processing system according to claim 18, wherein the detection device detects the distance, based on a position at which the reflected wave is received.

20. The information processing system according to claim 18, wherein the detection device detects the distance, based on time at which the reflected wave has been received.

21. The information processing system according to claim 1, wherein the distance data output device wirelessly transmits the distance data to the information processing apparatus directly or via other apparatus.

22. The information processing system according to claim 1, wherein
the information processing system further comprises:
a second input device to which operation input by the user is allowed; and
a cable connecting between the first input device and the second input device,
the distance data output device outputs the distance data to the second input device via the cable, and
the second input device comprises a transmission device configured to wirelessly transmit, to the information processing apparatus, data representing the operation input to the second input device, together with the distance data outputted by the distance data output device.

23. The information processing system according to claim 1, wherein
the first input device further comprises at least one load data output device configured to output load data determined in accordance with a load applied to the first platform,
the data acquisition device acquires the distance data outputted by the distance data output device and the load data outputted by the load data output device, and
the processing device performs the predetermined process, based on the distance data and the load data acquired by the data acquisition device.

24. The information processing system according to claim 23, wherein a plurality of the load data output devices are disposed below the first platform at different positions, and each outputs the load data determined in accordance with the load applied to the first platform.

25. The information processing system according to claim 23, wherein
the first input device comprises:
a first housing having a second platform on which at least a portion of a user's body is positioned;
a second housing, having the first platform, detachably mounted on a platform surface of the second platform so as to have the first platform face up,
the first housing is provided with at least the load data output device,
the second housing is provided with at least the distance data output device, and
the load data output device outputs, via the second housing, the load data determined in accordance with the load applied to the first platform.

26. The information processing system according to claim 1, wherein the information processing apparatus further comprises a display control device for displaying, on a display device, a result of the predetermined process performed by the processing device.

27. The information processing system according to claim 1, wherein
the processing device comprises:
a determination device configured to determine whether a distance in accordance with the distance data acquired by the data acquisition device reaches a predetermined value; and
an informing device configured to inform the user of a message determined in accordance with a determination result by the determination device.

28. The information processing system according to claim 1, wherein the distance data output device detects the distance to the object positioned in the direction away from the surface of the first platform, and outputs the distance data representing the distance.

29. The information processing system according to claim 1, wherein the at least one distance data output device is incorporated on the first platform on which at least the portion of the user's body is positioned.

30. The information processing system according to claim 1, wherein the distance data is related to a running and/or walking motion of the user moving in free space.

31. The information processing system according to claim 1, wherein the first input device further configured to provide stepping data associated with a number of steps the user steps on the first input device.

32. The information processing system according to claim 31, wherein at least a travel distance of the user is calculated based on at least the height data and the stepping data.

33. The information processing system according to claim 1, wherein the distance data output device is configured to output the distance data determined in accordance with the height of the user's appendage from the platform surface as the user stands on the platform surface of the first platform.

34. The information processing system according to claim 1, wherein the distance data allows for acquisition of a change in height of the user's appendage from the surface of the first platform during an action of the user raising his/her appendage from the first platform.

35. A non-transitory computer-readable storage medium comprising an information processing program executed by a computer of an information processing apparatus: for which data outputted by a first input device, on which at least a portion of a user's body is allowed to be positioned, is available; and for processing data obtained from the first input device, wherein the first input device including a surface, having an area on which a user positions his/her foot sole, the surface being set on a platform surface of the first platform, and the information processing program causing the computer to:

acquire, from at least one distance data output device disposed below the surface of the first input device adjacent to the area on which the user positions his/her foot sole, distance data allowing for acquisition of a distance between the surface and a height of an appendage of the user from the surface of the first input device during an action of the user raising his/her appendage from the first input device;

calculate at least an amount of exercise of the user based on the acquired distance data; and perform a predetermined process based on the calculated amount of exercise.

36. An information processing apparatus: for which data outputted by a first input device, on which at least a portion of a user's body is allowed to be positioned, is available, and for processing data obtained from the first input device, the first input device including a surface, having an area on which a user positions his/her foot sole, the surface being set on a platform surface of the first platform, and the information processing apparatus comprising:

a data acquisition device configured to acquire, from at least one distance data output device disposed below the surface of the first input device adjacent to the area on which the user positions his/her foot sole, distance data allowing for acquisition of a distance between the surface and a height of an appendage of the user from the surface of the first input device during an action of the user raising his/her appendage from the first input device; and a processing device configured to calculate at least an amount of exercise of the user based on the distance data acquired by the data acquisition device and perform a predetermined process based on the calculated amount of exercise.

37. An input device, comprising:

a first platform on which at least a portion of a user's body is positioned;

a surface, having an area on which a user positions his/her foot sole, is set on a platform surface of the first platform; and a distance data output device, disposed below the surface adjacent to the area on which the user positions his/her foot sole, the at least one distance data output device configured to output, to another device, distance data allowing for acquisition of a distance between the surface and a height of an appendage of the user from the surface of the first platform during an action of the user raising his/her appendage from the first platform, the distance data used to calculate at least an amount of exercise of the user.

38. An information processing method for processing data obtained from a first input device on which at least a portion of a user's body is allowed to be positioned, the first input device including a surface, having an area on which a user positions his/her foot sole, the surface being set on a platform surface of the first platform, and the information processing method comprising:

acquiring, from at least one distance data output device disposed below the surface of the first input device adjacent to the area on which the user positions his/her foot sole, distance data allowing for acquisition of a distance between the surface and a height of an appendage of the user from the surface of the first input device during an action of the user raising his/her appendage from the first input device;

calculating at least an amount of exercise of the user based on the acquired distance data; and performing a predetermined process based on the calculated amount of exercise.

\* \* \* \* \*